United States Patent
Matsuyama et al.

(10) Patent No.: US 6,903,473 B2
(45) Date of Patent: Jun. 7, 2005

(54) MOTOR HAVING CONNECTOR HOUSING

(75) Inventors: Youichi Matsuyama, Shinshiro (JP); Tadashi Adachi, Kosai (JP); Hiroshi Kokubu, Toyohashi (JP)

(73) Assignee: ASMO Co. Ltd., Shizuoka (JP)

( * ) Notice: Subject to any disclaimer, the term of this patent is extended or adjusted under 35 U.S.C. 154(b) by 0 days.

(21) Appl. No.: 10/662,369

(22) Filed: Sep. 16, 2003

(65) Prior Publication Data

US 2004/0061391 A1 Apr. 1, 2004

(30) Foreign Application Priority Data

Sep. 17, 2002 (JP) ........................... 2002-269807

(51) Int. Cl.[7] .................................................. H02K 5/22
(52) U.S. Cl. .................... 310/71; 310/75 R; 310/DIG. 6
(58) Field of Search ................................ 310/71, 75 R, 310/89, DIG. 6

(56) References Cited

U.S. PATENT DOCUMENTS

| | | | | |
|---|---|---|---|---|
| 5,204,565 A | * | 4/1993 | Sekine et al. .................. 310/71 |
| 5,245,258 A | * | 9/1993 | Becker et al. ............... 318/266 |
| 5,382,857 A | * | 1/1995 | Schellhorn et al. ........... 310/83 |
| 5,816,839 A | * | 10/1998 | Muta ........................... 439/342 |
| 6,107,713 A | * | 8/2000 | Hulsmann et al. ........ 310/75 R |
| 6,175,179 B1 | * | 1/2001 | Herve ........................ 310/232 |
| 6,191,512 B1 | * | 2/2001 | Lekeux et al. ................ 310/89 |
| 6,201,326 B1 | * | 3/2001 | Klappenbach et al. .... 310/75 R |
| 6,431,026 B1 | * | 8/2002 | Walther et al. ........... 74/606 R |
| 6,577,030 B2 | * | 6/2003 | Tominaga et al. ......... 310/68 B |
| 6,707,185 B2 | * | 3/2004 | Akutsu et al. ................ 310/71 |
| 6,729,433 B2 | * | 5/2004 | Uryu et al. ................. 180/444 |
| 6,742,413 B2 | * | 6/2004 | Schwital et al. .......... 74/606 R |

FOREIGN PATENT DOCUMENTS

| | | | | | |
|---|---|---|---|---|---|
| DE | 10101609 A | * | 7/2004 | ............ | H02K/11/00 |
| EP | 474904 | * | 3/1992 | .......... | H02K/23/66 |
| JP | 10-108402 | * | 4/1998 | ............ | H02K/5/14 |
| JP | 10-146008 | * | 5/1998 | ............ | H02K/5/22 |

* cited by examiner

Primary Examiner—Burton Mullins
(74) Attorney, Agent, or Firm—Posz Law Group, PLC

(57) ABSTRACT

A control circuit board is held in a gear housing of a motor, and a connector housing is connected to the gear housing. The connector housing is formed separately from the gear housing and includes a plurality of connection terminals that are secured to the connector housing. The connection terminals of the connector housing are connected with electric circuit components of the control circuit board. The connection terminals are also connected with corresponding terminals of an external connector when the external connector is connected to the connector housing.

15 Claims, 14 Drawing Sheets

MOTOR HAVING CONNECTOR HOUSING

CROSS REFERENCE TO RELATED APPLICATION

This application is based on and incorporates herein by reference Japanese Patent Application No. 2002-269807 filed on Sep. 17, 2002 and Japanese Patent Application No. 2003-185513 filed on Jun. 27, 2003.

BACKGROUND OF THE INVENTION

1. Field of the Invention

The present invention relates to a motor and more specifically to a motor that includes a connector housing, to which an external connector is connected.

2. Description of Related Art

One type of previously proposed motor used in, for example, a power window system includes a motor main body, a speed reducing unit, a control circuit board and a connector housing. The motor main body generates rotational force. The speed reducing unit includes a speed reducing mechanism received in a gear housing to reduce the rotational speed of the motor main body. The control circuit board includes electric circuit components. An external connector is connected to the connector housing.

In one such motor, the connector housing is integrally molded with the gear housing. In another motor, a receiving portion, which has an opening and receives the control circuit board, is provided in the gear housing or in a receiving member secured to the gear housing, and the connector housing is secured to the opening of the receiving portion. Furthermore, the control circuit board includes connection terminals, which are received in the connector housing when the connector housing is secured to the opening of the receiving portion. The connection terminals are connected to corresponding terminals of the external connector when the external connector is connected to the connector housing. Such a motor is disclosed, for example, in U.S. Pat. No. 6,107,713.

In the case of the above described type of motor, in which the connector housing is integrally molded with the gear housing, in order to provide various motors, each of which is connectable with the external connector of a different shape or the external connector of a different inserting direction, various gear housings, which are considered to be a relatively large component, need to be manufactured while using the same motor main body, the same speed reducing mechanism and the same control circuit board as universal components. This will cause an increase in motor manufacturing costs.

Furthermore, in the case of the motor disclosed in, for example, U.S. Pat. No. 6,107,713, the connector housing can be changed to allow connection of various external connectors to the motor. However, as described above, the connection terminals are provided in the control circuit board, so that when it is desired to obtain various motors, each of which is configured to connect with a different external connector having a different set of terminals (e.g., having a different terminal interval) or each of which is configured to connect with an external connector of a different inserting direction, it is required to manufacture various control circuit boards and various connector housings. This will cause an increase in motor manufacturing costs.

SUMMARY OF THE INVENTION

The present invention addresses the above disadvantages. Thus, it is an objective of the present invention to provide a versatile motor that can be modified to meet demands for accommodating various external connectors, each of which has a different shape or a different inserting direction, at relatively low costs.

To achieve the objective of the present invention, there is provided an electric motor including a motor main body, a speed reducing unit and a control circuit board. The motor main body is rotated upon energization of the motor main body. The speed reducing unit includes a speed reducing mechanism and a gear housing. The speed reducing mechanism reduces rotational speed of the motor main body, and the gear housing receives the speed reducing mechanism. The control circuit board is held in the gear housing and has at least one electric circuit component. The electric motor also includes a connector housing that is provided to the gear housing and is connectable with an external connector. The connector housing is formed separately from the gear housing. The connector housing includes a plurality of connection terminals that are secured to the connector housing. The connection terminals of the connector housing are connected with the at least one electric circuit component of the control circuit board and are connectable with corresponding terminals of the external connector.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION (First Embodiment)

Figure 1:
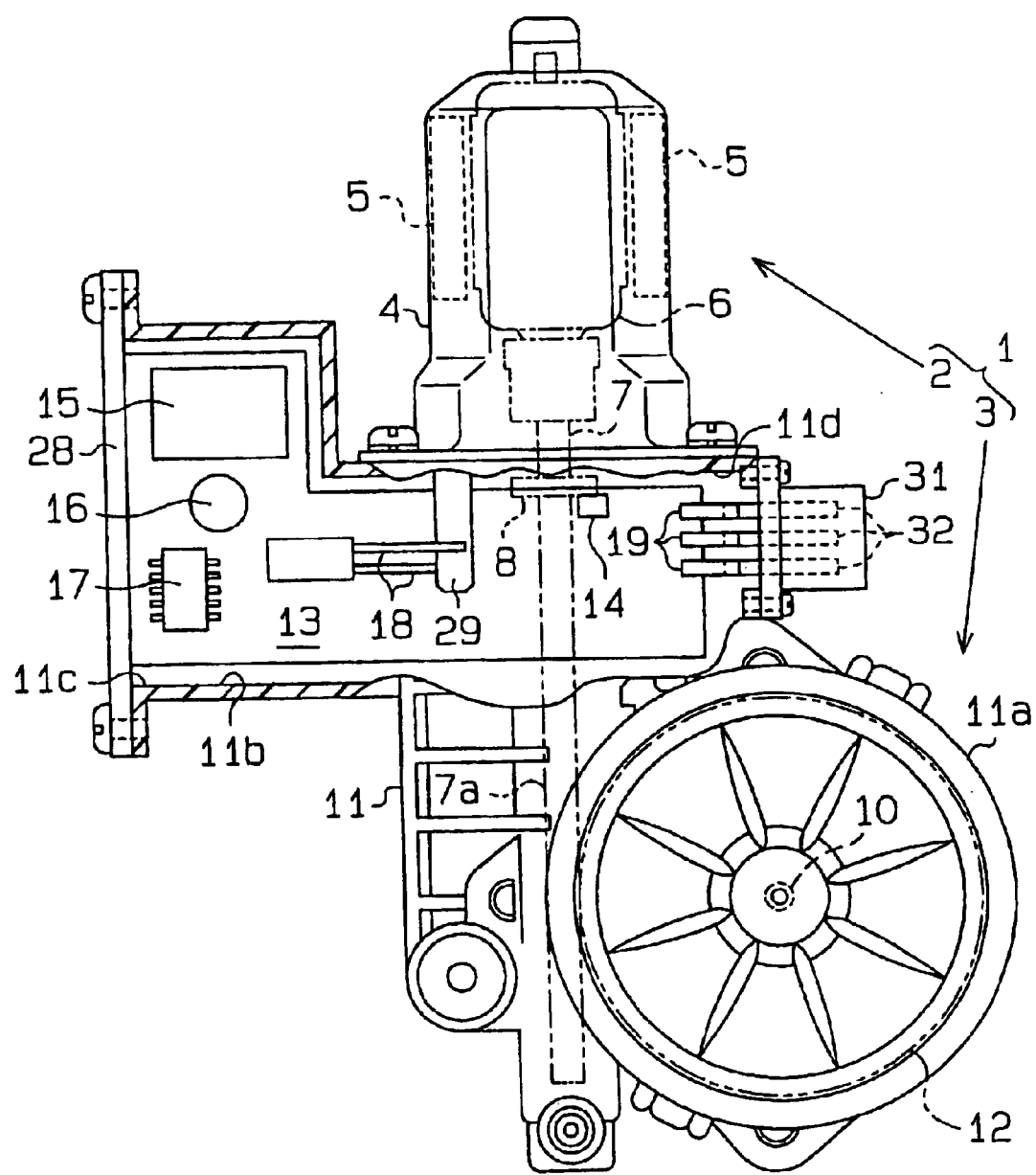
FIG. 1 is partially fragmented rear view of a motor according to a first embodiment of the present invention.
Figure 2:
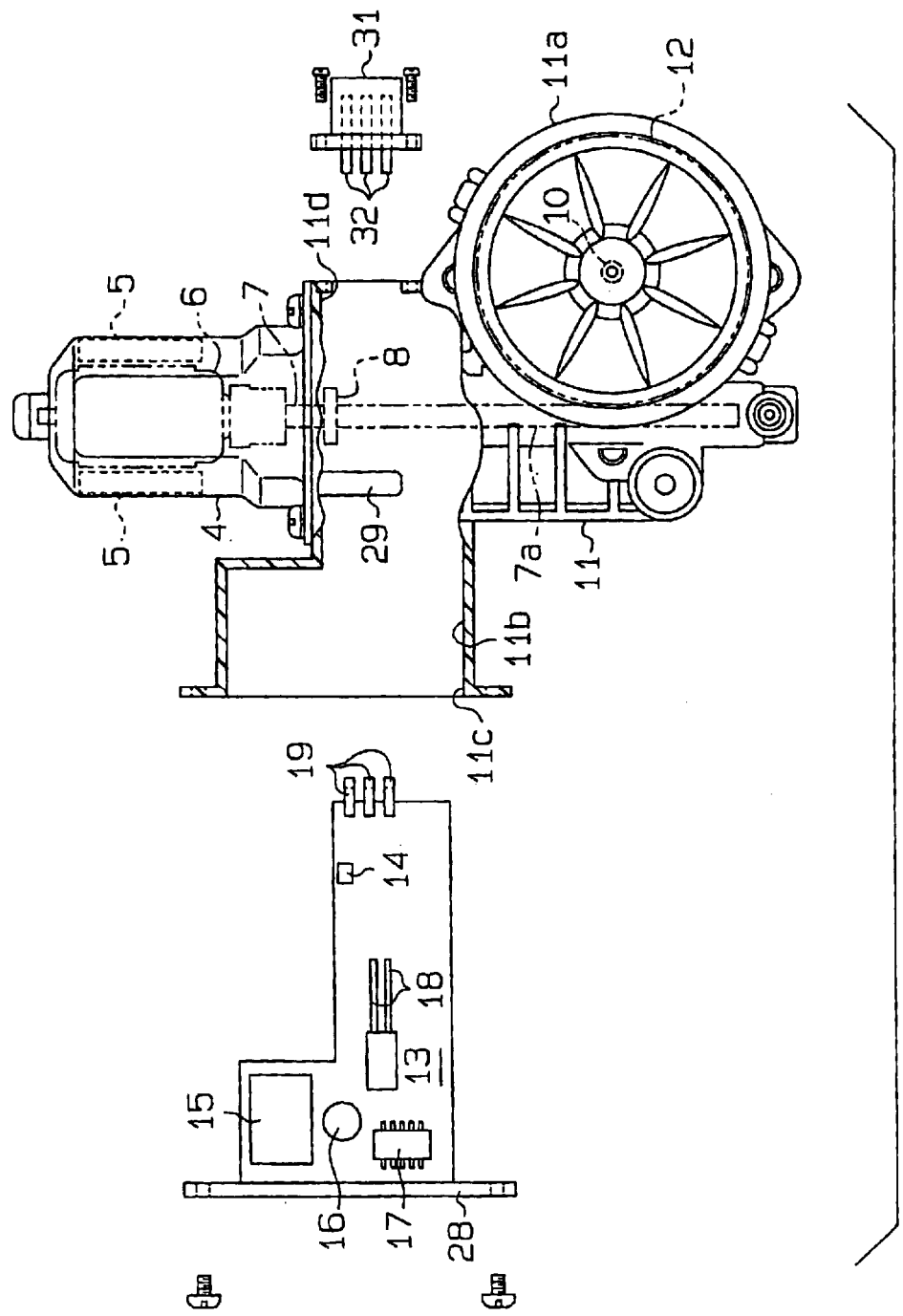
FIG. 2 is a partially fragmented and exploded rear view of the motor of the first embodiment.
Figure 3:
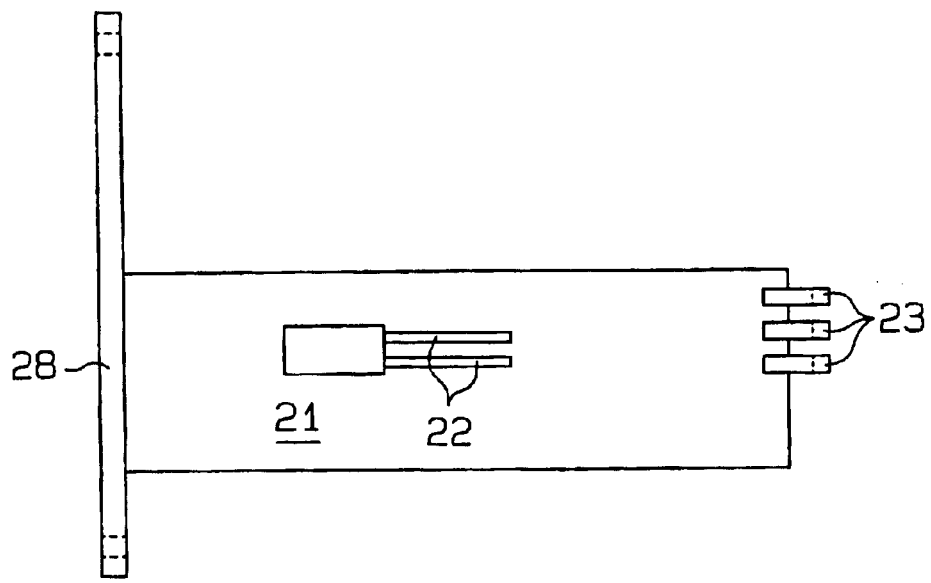
FIG. 3 is a frontal view of a control circuit board of a second design specification type according to the first embodiment.
Figure 4:
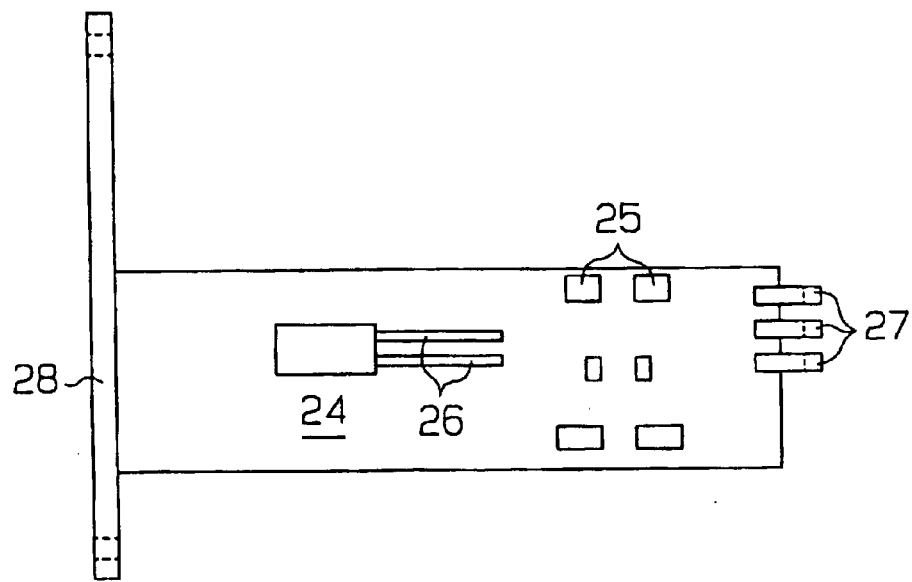
FIG. 4 is a frontal view of a control circuit board of a third design specification type according to the first embodiment.

A motor (power window motor) 1 of a vehicle power window system according to a first embodiment of the present invention will be described with reference to FIGS. 1 to 4. As shown in FIGS. 1 and 2, the motor 1 includes a motor main body 2 and a speed reducing unit 3. The motor main body 2 is rotated upon energization thereof. The speed reducing unit 3 reduces the rotational speed of the motor main body 2. The motor 1 is a flat type motor, which has a low profile in a direction perpendicular to the plane of FIG. 1.

The motor main body 2 includes a yoke housing (hereinafter, simply referred to as "yoke") 4, magnets 5 and an armature 6. The yoke 4 is formed into a cup shape. The magnets 5 are secured to an inner peripheral surface of the yoke 4. The armature 6 is rotatably supported and is received in the yoke 4. The armature 6 includes a rotatable shaft 7, and a worm 7a is formed in a distal end of the rotatable shaft 7, which protrudes from the yoke 4. A sensor magnet 8 is secured to an intermediate portion of the rotatable shaft 7, i.e., a portion of the rotatable shaft 7, which protrudes from the yoke 4 and is located on a yoke 4 side of the worm 7a. The armature 6 is indicated by a dot-dot dash line in FIGS. 1 and 2.

The speed reducing unit 3 includes a gear housing 11 made of a resin material and a worm wheel 12. The gear housing 11 is secured to an opening of the yoke 4. The worm wheel 12 is rotatably supported in a wheel receiving portion 11a defined in the gear housing 11 in such a manner that the worm wheel 12 is meshed with the worm 7a. An output shaft 10, which extends in a direction parallel to the rotational axis of the worm wheel 12 (i.e., the direction perpendicular to the plane of FIG. 1), is connected to the worm wheel 12 to output rotational force from the motor 1. The output shaft 10 projects from the worm wheel 12 in a direction away from the plane of FIG. 1 (i.e., the output shaft 10 projects backward from the plane of FIG. 1). In the present embodiment, the worm 7a and the worm wheel 12 constitute a speed reducing mechanism. The output shaft 10 is connected to a corresponding vehicle window glass through, for example, a regulator (not shown).

A circuit board receiving portion 11b is formed in a motor main body 2 side of the gear housing 11. The circuit board receiving portion 11b is formed into a generally rectangular tubular form that extends in a direction perpendicular to the rotatable shaft 7. More specifically, the circuit board receiving portion 11b is formed into the generally rectangular tubular form that extends in a direction, which is parallel to a flat direction of the gear housing 11 (i.e., the direction parallel to the plane of FIG. 1 or 2) and is perpendicular to the rotatable shaft 7, i.e., is parallel to a direction of extension of the wheel receiving portion 11a (i.e., the left-right direction in FIG. 1 or 2). Here, as discussed above, the motor 1 is the flat type motor, so that the flat direction of the gear housing 11 means a direction that is parallel to the plane of FIG. 1. Furthermore, at a first side of the circuit board receiving portion 11b where the wheel receiving portion 11a is not formed (i.e., the left side in FIG. 1 or 2), a peripheral wall of the circuit board receiving portion 11b projects on the motor main body 2 side thereof. In the present embodiment, an opening of the circuit board receiving portion 11b, which is located at the first side of the circuit board receiving portion 11b where the wheel receiving portion 11a is not formed (i.e., the left side in FIG. 1 or 2), is referred to as a circuit board installation opening 11c.

Furthermore, another opening of the circuit board receiving portion 11b, which is located at a second side of the circuit board receiving portion 11b where the wheel receiving portion 11a is formed (i.e., the right side in FIG. 1 or 2), is referred to as a connector installation opening 11d.

A control circuit board 13 is received and is held in the circuit board receiving portion 11b. The control circuit board 13 is configured to extend along an inner peripheral wall of the circuit board receiving portion 11b when the control circuit board 13 is seen in a direction perpendicular to the flat direction of the gear housing 11 (FIG. 1). Furthermore, a plane of the control circuit board 13 is parallel to an imaginary plane, which is perpendicular to a rotational axis of the output shaft 10. Electric circuit components are installed to the control circuit board 13.

The control circuit board 13 is changed based on the design specification of the motor 1. As shown in FIGS. 1 and 2, the control circuit board 13 of the first design specification type according to the present embodiment includes a Hall element 14, a relay 15, a capacitor 16, an integrated circuit (IC) 17, brush power supply terminals 18 and connection terminals 19 as the electric circuit components. In the control circuit board 13 of the present embodiment, the rotational speed of the sensor magnet 8 (i.e., the rotational speed of the rotatable shaft 7) is measured through the Hall element 14. When it is determined that an object is clamped by the window glass through the IC 17 based on the measured rotational speed of the sensor magnet 8, electric current for achieving reverse rotation of the motor main body 2 is supplied to the motor main body 2. That is, the control circuit board 13 has a clamping preventive control circuit. Besides this, as another example, with reference to FIG. 3, a control circuit board 21 of the second design specification type includes brush power supply terminals 22 and connection terminals 23 as the electric circuit components (without the Hall element 14 and the IC 17). Also, as a further example, with reference to FIG. 4, a control circuit board 24 of the third design specification type includes Hall elements 25, brush power supply terminals 26 and connection terminals 27 as the electric circuit components (without the IC 17). In comparison to the control circuit board 13 of the present embodiment, the control circuit boards 21, 24 have a smaller installation area and a simple shape (generally rectangular shape) due to the smaller number of the electric circuit components installed to the control circuit board 21, 24.

A closing and securing member 28 is secured to a base end side of the control circuit board 13 (21, 24), which corresponds to the circuit board installation opening 11c and is opposite from the connection terminals 19 (23, 27), i.e., the left side in FIGS. 1 to 4. The closing and securing member 28 is formed into a generally plate shape and is secured perpendicular to the control circuit board 13 (21, 24). The closing and the securing member 28 can be secured to the control circuit board 13 (21, 24), for example, by simple engagement, press fitting, snap fitting, bonding, welding, screwing or the like. The control circuit board 13, to which the closing and securing member 28 is secured, is inserted into the circuit board receiving portion 11b through the circuit board installation opening 11c and is held in a predetermined position when the closing and securing member 28 is secured (screwed) in such a manner that the closing and securing member 28 closes the circuit board installation opening 11c. In the present embodiment, the control circuit board 13 (closing and securing member 28) is installed to the gear housing 11 upon the assembly of the yoke 4 (i.e., the motor main body 2) with the gear housing 11. At this time, the brush power supply terminals 18 of the control circuit board 13 are connected to corresponding brush side terminals 29, which protrude from the motor main body 2 (yoke 4). Also, at this time, the Hall element 14 is positioned adjacent the sensor magnet 8.

A connector housing 31 is secured (screwed) to the connector installation opening 11d. The connector housing 31 is made of a resin material and is connectable with an external connector (not shown). The connector housing 31 includes connection terminals 32. The connection terminals 32 of the connector housing 31 are connected to the electric circuit components and more specifically to the connection terminals 19 of the control circuit board 13 when the connector housing 31 is installed to the gear housing 11 (more specifically, the connector installation opening 11d), in which the control circuit board 13 (21, 24) is provided. The connection terminals 32 of the connector housing 31 are connected to corresponding terminals of the external connector when the external connector is connected to the connector housing 31. In the present embodiment, the connection terminals 32 of the connector housing 31 are secured to the connector housing 31 by insert molding. Also, in the present embodiment, the connection terminals 19, 23, 27 of the control circuit board 13, 21, 24 are formed as female terminals, and the connection terminals 32 of the connector housing 31 at the control circuit board 13, 21, 24 side are formed as male terminals.

Here, it should be noted that the connector housing 31 is changed based on the design specification of the motor 1 to achieve the versatility of the motor 1. The design specification referred herein is the design specification that is independent from the design specification of the control circuit board 13 (21, 24), i.e., that is changeable independently. In other words, it is not necessary to exclusively use the connector housing 31 for the control circuit board 13 of the first design specification type. As shown in FIGS. 1 and 2, in the connector housing 31 according to the design specification of the present embodiment, the number of the connection terminals 32 is three. The three connection terminals 32 are arranged at equal intervals and are parallel to one another. The external connector is connected to the connector housing 31 from the side (the right side in FIG. 1 or 2), at which the wheel receiving portion 11a is formed, in a direction that is parallel to the flat direction of the gear housing 11 and is perpendicular to the rotatable shaft 7. Although not depicted, as a connector housing of a different design specification type, the connector housing can be bent to allow connection of the external connector in the direction perpendicular to the flat direction of the gear housing 11 (i.e., the direction perpendicular to the plane of FIG. 1 or 2), and the connection terminals of the connector housing can be similarly bent.

In the thus constructed motor 1 (vehicle power window system), drive electric current is supplied from an undepicted control device (power supply device) to the armature 6 through the terminals of the external connector, the connection terminals 32 of the connector housing 31, the connection terminals 19 of the control circuit board 13, the brush power supply terminals 18 and the brush side terminals 29, so that the armature 6 is driven to rotate. Then, according to the rotation of the rotatable shaft 7, the worm wheel 12 and the output shaft 10 are rotated, and the rotational force of the output shaft 10 is converted into linear movement through, for example, the regulator to raise or lower the window glass. At this time, in the motor 1 of the design specification according to the present embodiment, the rotational speed of the sensor magnet 8 (i.e., the rotational speed of the rotatable shaft 7) is measured through the Hall element 14. At the time of raising the vehicle window glass, when it is determined that an object is clamped by the window glass in the IC 17 based on the measured rotational speed of the sensor magnet 8, the electric current for achieving reverse rotation of the motor main body 2 is supplied to the motor main body 2. Thus, the window glass is lowered to prevent the substantial clamping of the object.

Next, advantages of the first embodiment will be described.

(1) The connector housing 31 is provided separately from the gear housing 11 and is installed to the gear housing 11 upon the assembly of the yoke 4 (i.e., the motor main body 2) with the gear housing 11. Furthermore, the connector housing 31 includes the connection terminals 32, which are connected to the electric circuit components (more specifically, the connection terminals 19 of the control circuit board 13) when the connector housing 31 is connected to, i.e., is installed to the gear housing 11, in which the control circuit board 13 is provided. The connection terminals 32 of the connector housing 31 are connected to the terminals of the external connector when the external connector is connected to the connector housing 31. Thus, for example, various motors, each of which is configured to connect with an external connector of a different shape or each of which is configured to connect with an external connector of a different inserting direction, can be obtained while using the same control circuit board 13 and the same gear housing 11 as universal components by changing only the connector housing 31. Furthermore, prior to the installation of the connector housing 31 to the gear housing 11, such as prior to deciding the design specification of the connector housing 31, the motor main body 2 and the gear housing 11 can be managed as an integral component in the parts management to allow easy parts management. Furthermore, the connector housing 31 is installed to the gear housing 11, in which the control circuit board 13 is provided, and thus the connection terminals 32 of the connector housing 31 are connected to the electric circuit components (more specifically, the connection terminals 19) of the control circuit board 13, thereby allowing easy installation of the connector housing 31. As a result, the motor 1 can be modified at the low costs to meet various demands with respect to, for example, the shape of the external connector and/or the inserting direction of the external connector.

(2) The control circuit board 13 (21, 24) can be installed to the gear housing 11 upon the assembly of the yoke 4 (i.e., the motor main body 2) with the gear housing 11. Thus, various motors, each of which has a different set of electric circuit components (i.e., a control circuit board 13 of a different type), can be obtained while using the same gear housing 11 as the universal component by changing the control circuit board 13 upon the assembly of the yoke 4 (i.e., the motor main body 2) with the gear housing 11.

(3) The control circuit board 13, to which the closing and securing member 28 is secured, is inserted into the circuit board receiving portion 11b through the circuit board installation opening 11c and is held in the predetermined position when the closing and securing member 28 is secured (screwed) in such a manner that the closing and securing member 28 closes the circuit board installation opening 11c. Thus, for example, the control circuit board 13 and the closing and securing member 28 can be secured together in advance before, for example, deciding the design specification of the control circuit board 13 (21, 24). This allows easy parts management and easy securing of these components to the gear housing 11. Furthermore, the securing of these components allows closing of the circuit board installation opening 11c.

(4) The connector housing 31 is installed to the gear housing 11 in the direction parallel to the flat direction of the gear housing 11. Thus, the connector housing 31 is less likely to protrude from the gear housing 11 in the direction perpendicular to the flat direction of the motor 1. That is, in comparison to the case where the connector housing is installed to the gear housing in a direction perpendicular to the flat direction of the gear housing, it is easy to achieve the flatness of the motor 1.

(5) The connector installation opening 11d and the circuit board installation opening 11c are provided in the gear housing 11 in a manner that allows independent installation of the connector housing 31 and the control circuit board 13 to the gear housing 11 from the opposite directions. Thus, for example, the installation sequence of the connector housing 31 and the control circuit board 13 can be freely selected. Also, for example, at the time of failure of the control circuit board 13 (i.e., the electric circuit components of the control circuit board 13), the failed control circuit board 13 or the failed electric circuit component of the control circuit board 13 can be easily changed without requiring removal of the connector housing 31 from the gear housing 11.

(6) The connector installation opening 11d and the circuit board installation opening 11c are angularly spaced 180 degrees from one another along a straight line to allow installation of the connector housing 31 and the control circuit board 13 to the gear housing 11 from opposite directions, which are angularly spaced 180 degrees from one another. Thus, the connection terminals 32 of the connector housing 31 and the connection terminals 19 (23, 27) of the control circuit board 13 (21, 24) can be made as the male terminals of the simple structure and the female terminals of the simple structure, respectively. Furthermore, installation sequence of the connector housing 31 and the control circuit board 13 (21, 24) can be freely selected. That is, the connection terminals 32 of the connector housing 31 can be connected to the electric circuit components upon installation of the connector housing 31 to the gear housing 11, to which the control circuit board 13 is previously installed, or alternatively, upon installation of the control circuit board 13 to the gear housing 11, to which the connector housing 31 is previously installed.

(7) The control circuit board 13 is arranged in such a manner that the plane of the control circuit board 13 is parallel to the flat direction of the gear housing 11. Thus, the flatness of the motor 1 can be easily achieved.

(Second Embodiment)

Figure 5:
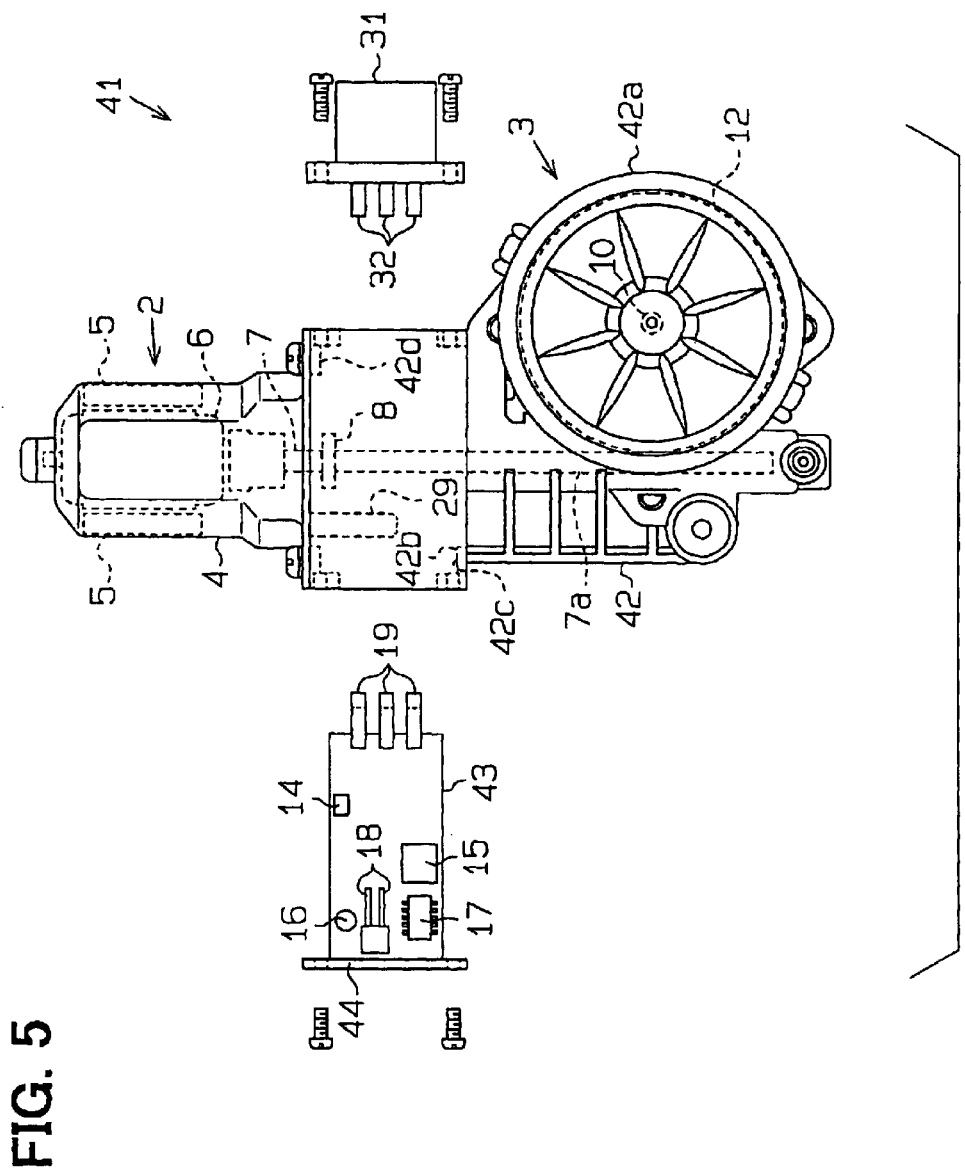
FIG. 5 is an exploded rear view of a motor according to a second embodiment of the present invention.

A motor (power window motor) 41 used in the vehicle power window system according to a second embodiment of the present invention will be described with reference to FIG. 5. In the present embodiment, different components of the motor 41, which are different from those of the motor 1 of the first embodiment, will be described in detail, and similar components of the motor 41, which are similar to those of the motor 1 of the first embodiment, will be indicated by the same numerals and will not be described in detail.

A gear housing 42 includes a wheel receiving portion 42a, which receives the worm wheel 12. The gear housing 42 also includes a circuit board receiving portion 42b. The circuit board receiving portion 42b is formed into a generally rectangular tubular form that extends in a direction perpendicular to the rotatable shaft 7. More specifically, the circuit board receiving portion 42b is formed into the generally rectangular tubular form that extends in a direction, which is parallel to a flat direction of the gear housing 42 (i.e., the direction parallel to the plane of FIG. 5) and is perpendicular to the rotatable shaft 7, i.e., is parallel to a direction of extension of the wheel receiving portion 42a (i.e., the left-right direction in FIG. 5). The circuit board receiving portion 42b of the present embodiment is generally symmetrical about the rotatable shaft 7. Furthermore, in the present embodiment, an opening of the circuit board receiving portion 42b, which is located at a first side of the circuit board receiving portion 42b where the wheel receiving portion 42a is not formed (i.e., the left side in FIG. 5), is referred to as a circuit board installation opening 42c. Furthermore, another opening of the circuit board receiving portion 42b, which is located at a second side of the circuit board receiving portion 42b where the wheel receiving portion 42a is formed (i.e., the right side in FIG. 5), is referred to as a connector installation opening 42d. However, in the present embodiment, as described above, the circuit board receiving portion 42b is generally symmetrical about the rotatable shaft 7. Thus, the control circuit board 43 can be installed in the circuit board receiving portion 42b through the connector installation opening 42d (i.e., the connector installation opening 42d now serves as the circuit board installation opening), and the connector housing 31 can be secured to the circuit board installation opening 42c (i.e., the circuit board installation opening 42c now serves as the connector installation opening). That is, the control circuit board 43 and the connector housing 31 can be installed to the gear housing 42 from any of the circuit board installation opening 42c and the connector installation opening 42d.

The control circuit board 43 of the present embodiment has a simple shape (generally rectangular shape) and is shorter in comparison to the control circuit board 13 of the first embodiment. The control circuit board 43 is of the first design specification type and thus has the Hall element 14, the relay 15, the capacitor 16, the IC 17, the brush power supply terminals 18 and the connection terminals 19. Furthermore, a closing and securing member 44, which is substantially the same as the closing and securing member 28 of the control circuit board 13, is secured to the control circuit board 43. Thus, the control circuit board 43, to which the closing and securing member 44 is secured, is inserted into the circuit board receiving portion 42b through one of the circuit board installation opening 42c and the connector installation opening 42d and is held in a predetermined position when the closing and securing member 44 is secured in such a manner that the closing and securing member 44 closes the one of circuit board installation opening 44c and the connector installation opening 42d.

In addition to advantages similar to the advantages of the first embodiment discussed in the sections (1) to (7) of the first embodiment, the motor 41 of the second embodiment can provide the following advantages.

(1) The circuit board installation opening 42c and the connector installation opening 42d have an identical shape and size, so that the control circuit board 43 can be inserted into the circuit board receiving portion 42b through the connector installation opening 42d (i.e., the connector installation opening 42d now serves as a circuit board installation opening), and the connector housing 31 can be secured to the circuit board installation opening 42c (i.e., the circuit board installation opening 42c now serves as a connector installation opening). Thus, with the simple structure, the position of the connector housing 31 and the orientation of the control circuit board 43 can be changed to provide various motors, each of which connects with an external connector of a substantially different inserting direction (e.g., the external connector having the inserting direction, which is varied 180 degrees from that of the other type of external connector). By a way of example, in a case where a plurality of connector installation openings is provided, and the connector housing is secured to a selected one of the connector installation openings, the remaining unselected connector installation openings needs to be closed by components other than the connector housing. However, according to the present embodiment, there is no such a need.

(Third Embodiment)

Figure 6:
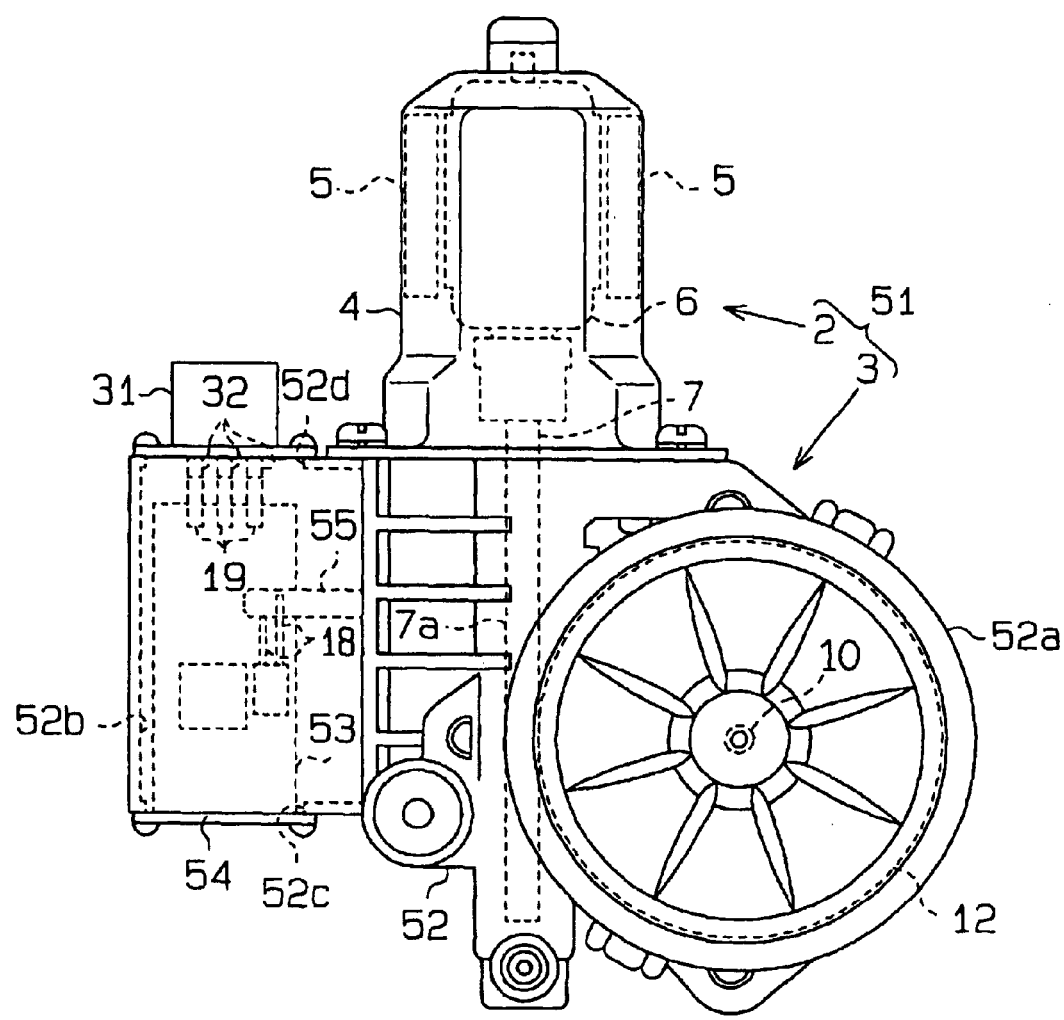
FIG. 6 is a rear view of a motor according to a third embodiment of the present invention.

A motor (power window motor) 51 used in the vehicle power window system according to a third embodiment of the present invention will be described with reference to FIG. 6. In the present embodiment, different components of the motor 51, which are different from those of the motor 1 of the first embodiment, will be described in detail, and similar components of the motor 51, which are similar to those of the motor 1 of the first embodiment, will be indicated by the same numerals and will not be described in detail.

A gear housing 52 includes a wheel receiving portion 52a, which receives the worm wheel 12. The gear housing 52 also includes a circuit board receiving portion 52b. The circuit board receiving portion 52b is formed into a generally rectangular tubular form that extends in a direction perpendicular to the rotatable shaft 7 on one side of the rotatable shaft 7, which is opposite from the wheel receiving portion 52a. More specifically, the circuit board receiving portion 52b is formed into the generally rectangular tubular form that is located on the one side of the rotatable shaft 7, which is 180 degrees opposite from the wheel receiving portion 52a, and extends in a direction, which is parallel to a flat direction of the gear housing 52 (i.e., the direction parallel to the plane of FIG. 6) and is perpendicular to the rotatable shaft 7 (i.e., the top-bottom direction in FIG. 6) The circuit board receiving portion 52b of the present embodiment is generally symmetrical about an imaginary line, which extends perpendicular to the rotatable shaft 7 and passes the axial center of the rotatable shaft 7. Furthermore, in the present embodiment, an opening of the circuit board receiving portion 52b, which is located at one side of the circuit board receiving portion 42b where the motor main body 2 is not secured (i.e., the bottom side in FIG. 6), is referred to as a circuit board installation opening 52c. Furthermore, another opening of the circuit board receiving portion 52b, which is located at another side of the circuit board receiving portion 52b where the motor main body 2 is secured (i.e., the top side in FIG. 6), is referred to as a connector installation opening 52d. However, in the present embodiment, the control circuit board 53 can be installed in the circuit board receiving portion 52b through the connector installation opening 52d (i.e., the connector installation opening 52d now serves as a circuit board installation opening), and the connector housing 31 can be secured to the circuit board installation opening 52c (i.e., the circuit board installation opening 52c now serves as a connector installation opening). That is, the control circuit board 53 and the connector housing 31 can be installed to the gear housing 52 from any of the circuit board installation opening 52c and the connector installation opening 52d.

A closing and securing member 54, which is substantially the same as the closing and securing member 28 of the control circuit board 13 of the first embodiment, is secured to the control circuit board 53. Thus, the control circuit board 53, to which the closing and securing member 54 is secured, is inserted into the circuit board receiving portion 52b through one of the circuit board installation opening 52c and the connector installation opening 52d and is held in a predetermined position when the closing and securing member 54 is secured in such a manner that the closing and securing member 54 closes the one of circuit board installation opening 52c and the connector installation opening 52d. Furthermore, in the present embodiment, brush side terminals 55, which are connected to corresponding power supply brushes of the motor main body 2, extend in a direction perpendicular to the rotatable shaft 7 and are projected into the circuit board receiving portion 52b. The brush power supply terminals 18 provided in the control circuit board 53 are connected to the brush side terminals 55 at the time of installing the circuit board 53 into the circuit board receiving portion 52b.

The motor 51 of the third embodiment can provide advantages similar to the advantages of the first embodiment discussed in the sections (1) to (7) of the first embodiment and the advantages of the second embodiment discussed in the section (1) of the second embodiment.

(Fourth Embodiment)

Figure 7:
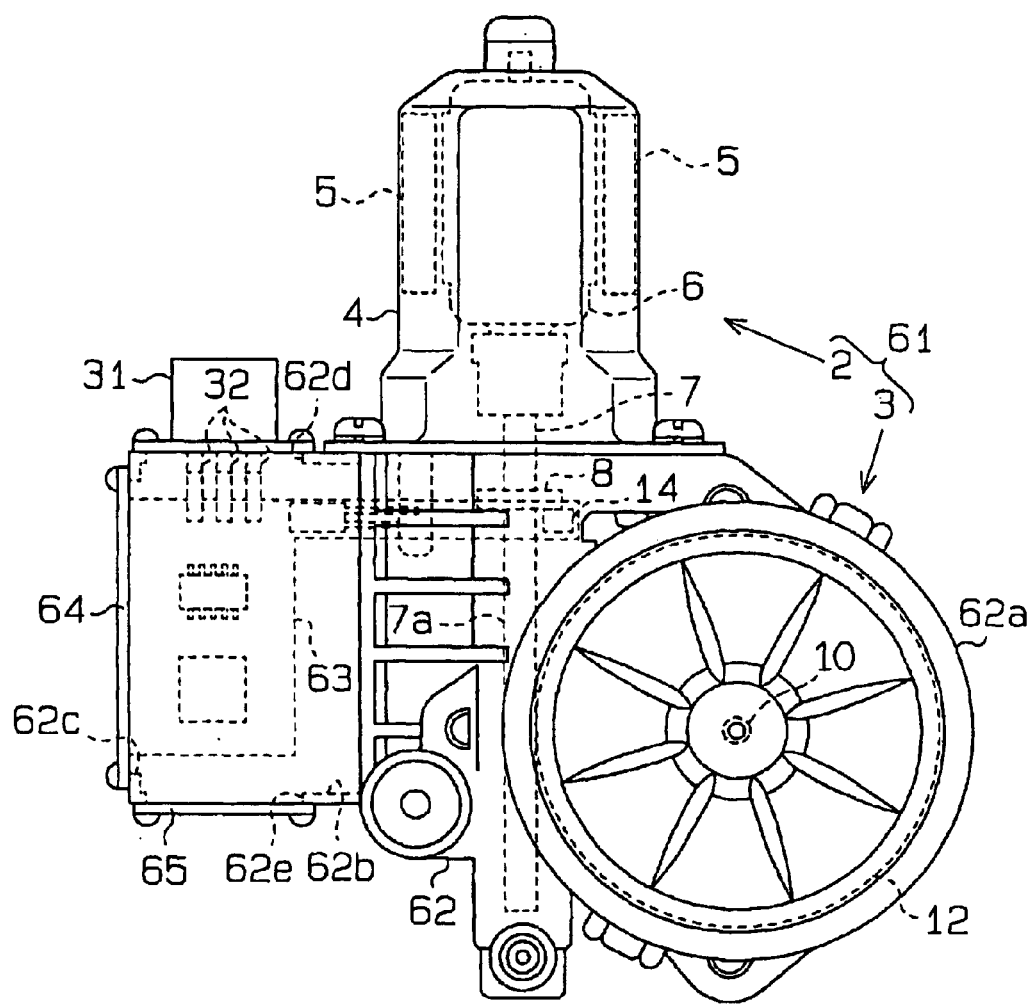
FIG. 7 is a rear view of a motor according to a fourth embodiment of the present invention.

A motor (power window motor) 61 used in the vehicle power window system according to a fourth embodiment of the present invention will be described with reference to FIG. 7. In the present embodiment, different components of the motor 61, which are different from those of the motor 1 of the first embodiment, will be described in detail, and similar components of the motor 61, which are similar to those of the motor 1 of the first embodiment, will be indicated by the same numerals and will not be described in detail.

A gear housing 62 includes a wheel receiving portion 62a, which receives the worm wheel 12. The gear housing 62 also includes a circuit board receiving portion 62b provided on one side of the rotatable shaft 7, which is opposite from the wheel receiving portion 62a. The circuit board receiving portion 62b is formed into a generally rectangular tubular form. Furthermore, the circuit board receiving portion 62b includes three openings. Two of the openings of the circuit board receiving portion 62b are opposed to one another in a direction parallel to the rotatable shaft 7 (i.e., top-bottom direction in FIG. 7), and the remaining one of the openings of the circuit board receiving portion 62b is placed at one lateral side (the left side in FIG. 7) of the circuit board receiving portion 62b to open in a direction perpendicular to the rotatable shaft 7. The circuit board receiving portion 62b of the present embodiment is generally symmetrical about an imaginary line, which extends perpendicular to the rotatable shaft 7 and passes the axial center of the rotatable shaft 7. Furthermore, in the present embodiment, the opening, which is placed at the lateral side (the left side in FIG. 6) of the circuit board receiving portion 62b to open in the direction perpendicular to the rotatable shaft 7, is referred to as a circuit board installation opening 62c, and the openings, which are opposed to one another in the direction parallel to the rotatable shaft 7 (i.e., top-bottom direction in FIG. 7), are referred to as connector installation openings 62d, 62e. That is, in the present embodiment, there are provided the two connector installation openings 62d, 62e, to each of which the connector housing 31 can be secured.

Furthermore, a closing and securing member 64, which is substantially the same as the closing and securing member 28 of the control circuit board 13 of the first embodiment, is secured to the control circuit board 63 of the present embodiment. Thus, the control circuit board 63, to which the closing and securing member 64 is secured, is inserted into the circuit board receiving portion 52b through the circuit board installation opening 62c and is held in a predetermined position when the closing and securing member 64 is secured in such a manner that the closing and securing member 64 closes the circuit board installation opening 62c. The connector housing 31 is secured to the connector installation opening 62d (62e) in a direction perpendicular to the installation direction of the control circuit board 63. In the present embodiment, a separate closing member 65 is secured to the connector installation opening 62e (i.e., the remaining unselected connector installation opening), to which the connector housing 31 is not secured, to close the connector installation opening 62e.

In addition to advantages similar to the advantages of the first embodiment discussed in the sections (1) to (4) and (7) of the first embodiment, the motor 61 of the fourth embodiment can provide the following advantages.

(1) The gear housing 62 has the plurality (two in this embodiment) of connector installation openings 62d, 62e, to each of which the connector housing 31 can be secured. Thus, the connector installation opening 62d, to which the connector housing 31 is secured, can be changed (selected) to provide various motors, each of which connects with an external connector of a substantially different inserting direction (e.g., the external connector having the inserting direction, which is varied 180 degrees from that of the other external connector).

(Fifth Embodiment)

Figure 8:
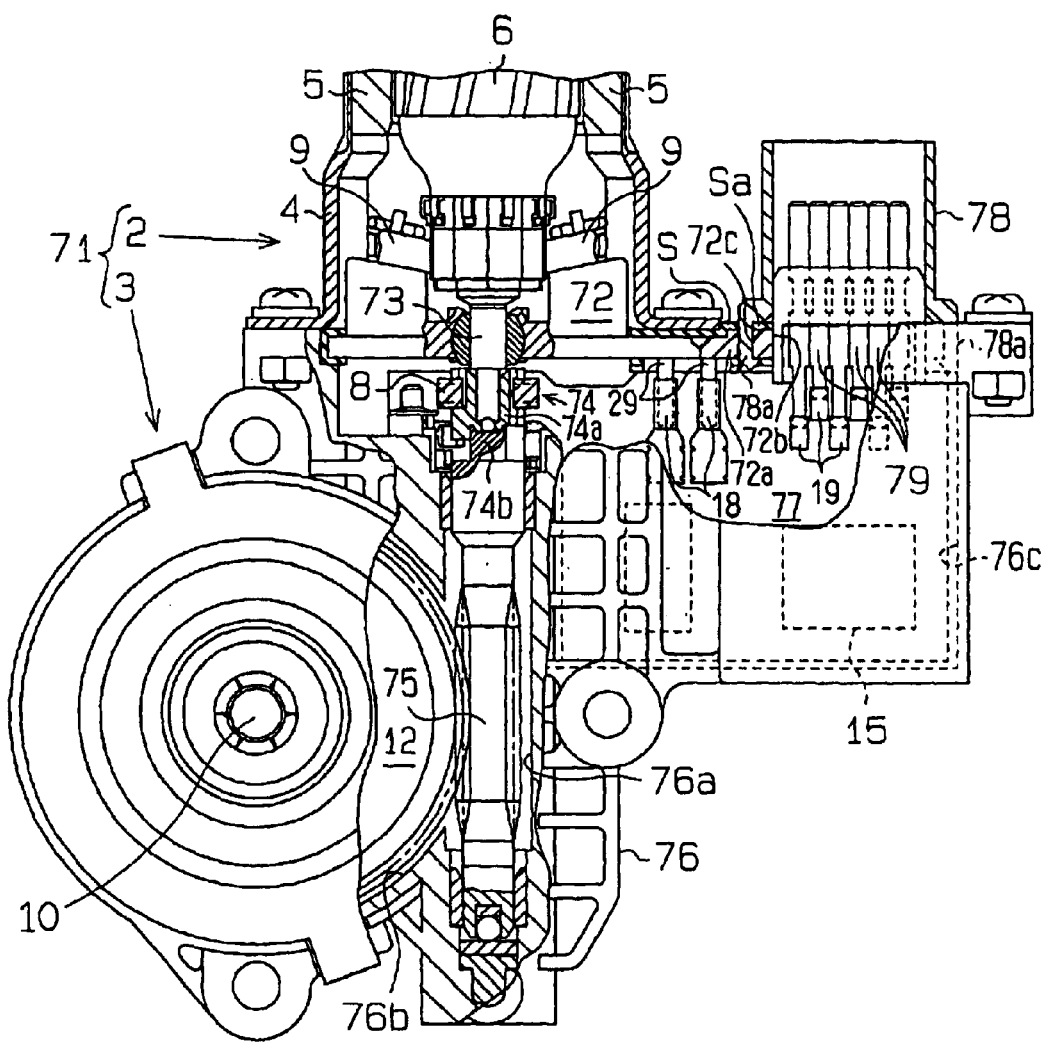
FIG. 8 is a partially fragmented frontal view of a motor according to a fifth embodiment of the present invention.
Figure 9:
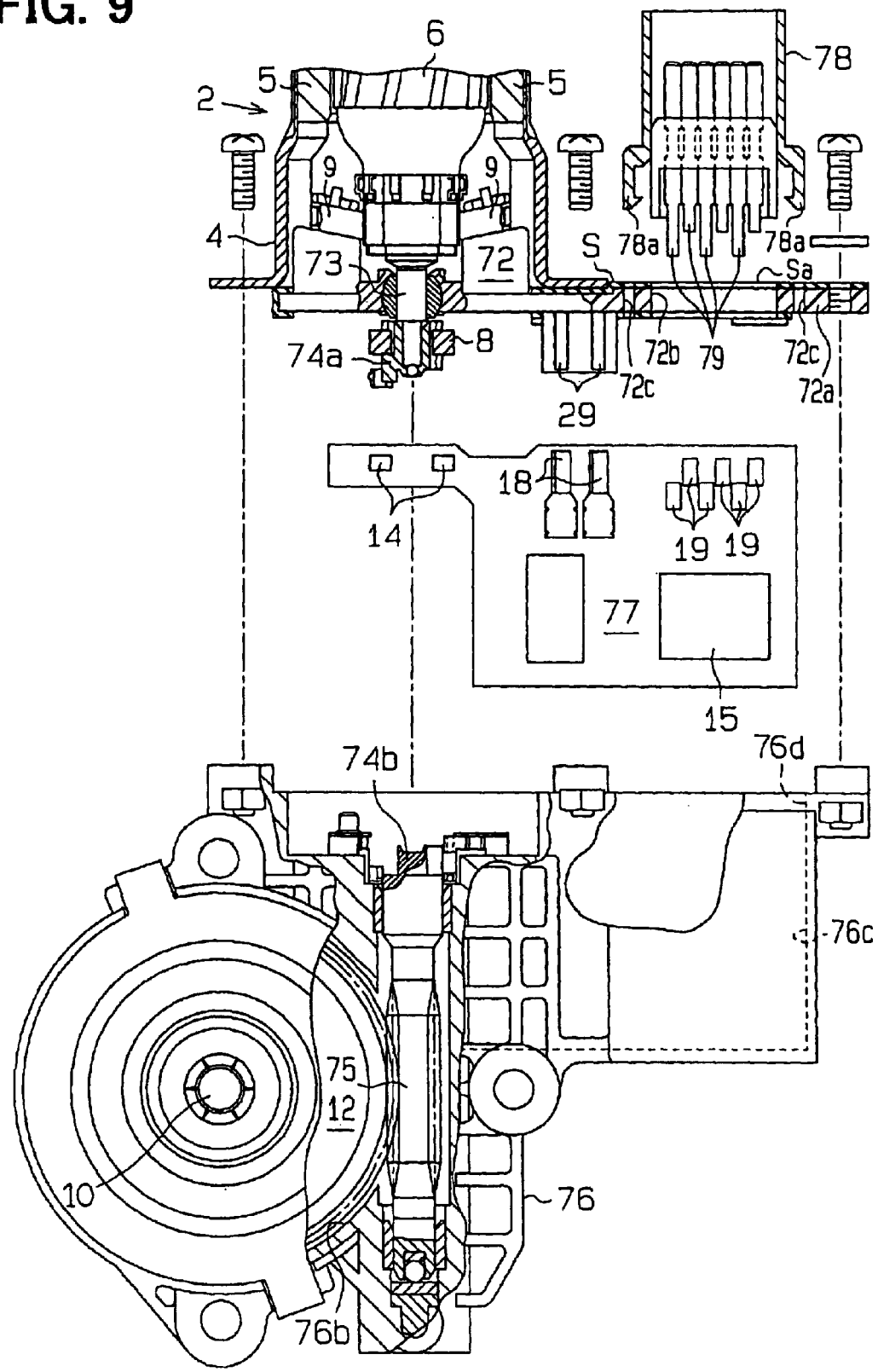
FIG. 9 is a partially fragmented and exploded frontal view of a motor according to a fifth embodiment of the present invention.

A motor (power window motor) 71 used in the vehicle power window system according to a fifth embodiment of the present invention will be described with reference to FIGS. 8 and 9. In the present embodiment, different components of the motor 71, which are different from those of the motor 1 of the first embodiment, will be described in detail, and similar components of the motor 71, which are similar to those of the motor 1 of the first embodiment, will be indicated by the same numerals and will not be described in detail.

The motor main body 2 of the present embodiment includes a brush holder member 72, which is secured to the opening of the yoke 4 and supports power supply brushes 9. The brush holder member 72 includes an extension 72a, which projects radially outward from the opening of the yoke 4. The extension 72a extends in the direction generally parallel to the flat direction of the yoke 4 and is located on one side (the right side in FIG. 8) of the yoke 4. A connector installation opening 72b penetrates through an intermediate part of the extension 72a in a direction parallel to a rotatable shaft 73. Furthermore, in the present embodiment, two engaging holes 72c (FIG. 9) are provided on the opposite sides, respectively, of the connector installation opening 72b in the extension 72a.

The rotatable shaft 73 of the present embodiment is different from the rotatable shaft 7 of the first embodiment. That is, the rotatable shaft 73 is connected to a worm shaft 75 through a clutch 74. The clutch 74 transmits rotational force from the motor main body 2 to the worm wheel 12, which is connected to the output shaft 10, and restrains transmission of rotational force from the worm wheel 12 to the motor main body 2. The clutch 74 is of a known type and includes a driving-side rotator 74a, which is provided (secured) to the rotatable shaft 73, and a driven-side rotator 74b, which is provided to the worm shaft 75.

A gear housing 76 includes a worm shaft receiving portion 76a, which receives and supports the worm shaft 75, and a wheel receiving portion 76b, which receives the worm wheel 12. The gear housing 76 further includes a circuit board receiving portion 76c on one side of the worm shaft 75, which is opposite from the wheel receiving portion 76b. The circuit board receiving portion 76c is formed into a generally rectangular tubular form and has an opening 76d at a side (the top side in FIG. 9), which corresponds to the extension 72a of the brush holder member 72. This opening 76d serves as a circuit board installation opening.

A resilient sealing member S is provided to the brush holder member 72. The resilient sealing member S seals a secured connection between the motor main body 2 (more specifically, the yoke 4) and the gear housing 76. More specifically, the resilient sealing member S is exposed from the yoke 4 at the brush holder member 72 and covers an engaging portion of the brush holder member 72, which is engaged with the gear housing 76. A connector sealing portion Sa is integrally molded with the resilient sealing member S. The connector sealing portion Sa is arranged around the connector installation opening 72b.

A control circuit board 77 of the present embodiment includes the Hall elements 14 (FIG. 9), the relay 15, the brush power supply terminals 18 and the connection terminals 19 as the electric circuit components. At the time of assembling the yoke 4 (i.e., the motor main body 2) with the gear housing 76, the control circuit board 77 is received into the circuit board receiving portion 76c through the circuit board installation opening 76d and is held in the circuit board receiving portion 76c. At this time, the brush power supply terminals 18 are connected to the corresponding brush side terminals 29. Furthermore, at this time, the Hall elements 14 are positioned adjacent the sensor magnet 8. Also, at this time, the connection terminals 19 of the control circuit board 77 are arranged adjacent the connector installation opening 72b. In addition, at this time, the driving-side rotator 74a of the rotatable shaft 73 is connected to the driven-side rotator 74b of the worm shaft 75.

A connector housing 78 of the present embodiment includes two engaging claws 78a, which are engageable with the corresponding engaging holes 72c of the extension 72a. When the engaging claws 78a of the connector housing 78 are engaged with the engaging holes 72c of the extension 72a, the connector housing 78 is secured to the connector installation opening 72b. The connector housing 78 also includes connection terminals 79. The connection terminals 79 of the connector housing 78 are connected to the electric circuit components and more specifically to the connection terminals 19 of the control circuit board 77 when the connector housing 78 is installed to the gear housing 76 (actually, to the brush holder member 72), in which the control circuit board 77 is installed. The connection terminals 79 of the connector housing 78 are connected to corresponding terminals of the external connector when the external connector is connected to the connector housing 78. Similar to the first embodiment, the connector housing 78 is changed based on the design specification of the motor 71. In the present embodiment, when the connector housing 78 is secured to the connector installation opening 72b, a secured connection between the connector housing 78 and the peripheral edge of the installation opening 72b is sealed by the connector sealing portion Sa.

In addition to advantages similar to the advantages of the first embodiment discussed in the sections (1), (4) and (7) of the first embodiment, the motor 71 of the fifth embodiment can provide the following advantages.

(1) The connector sealing portion Sa, which seals the secured connection between the gear housing 76 side (more specifically, the brush holder member 72) and the connector housing 78, is integrally molded in the resilient sealing member S, which is provided in the brush holder member 72 and seals the secured connection between the motor main body 2 (i.e., the yoke 4) and the gear housing 76. With this arrangement, the secured connection between the gear housing 76 and the connector housing 78 can be sealed while minimizing the number of components.

(2) The control circuit board 77 and the connector housing 78 can be installed from the same side (i.e., the top side in FIG. 9) in the same direction, so that installation of these components is eased, allowing easy implementation of automatic assembly of these components in some cases.

(Sixth Embodiment)

Figure 10:
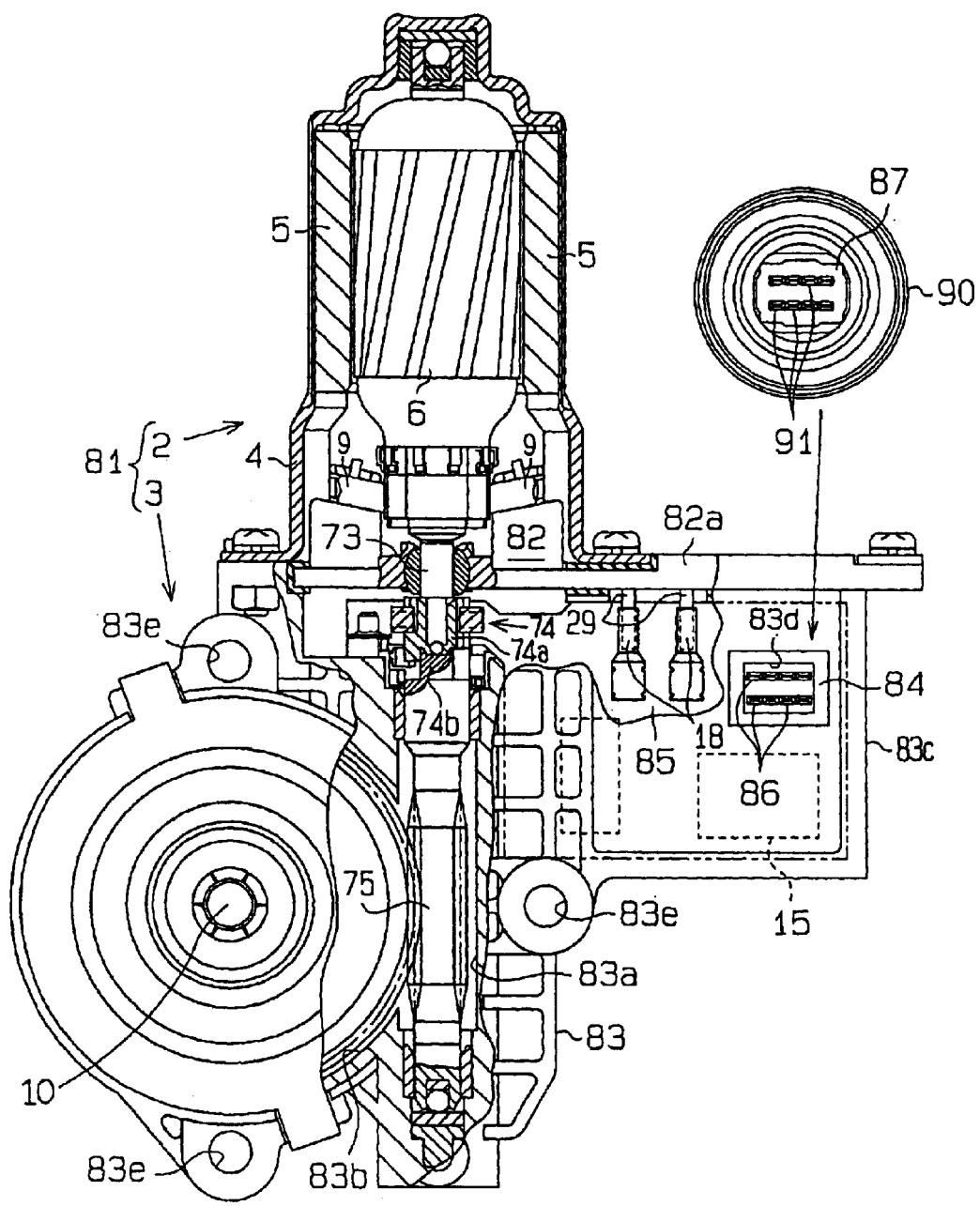
FIG. 10 is a partially fragmented and exploded frontal view of a motor according to a sixth embodiment of the present invention.
Figure 11:
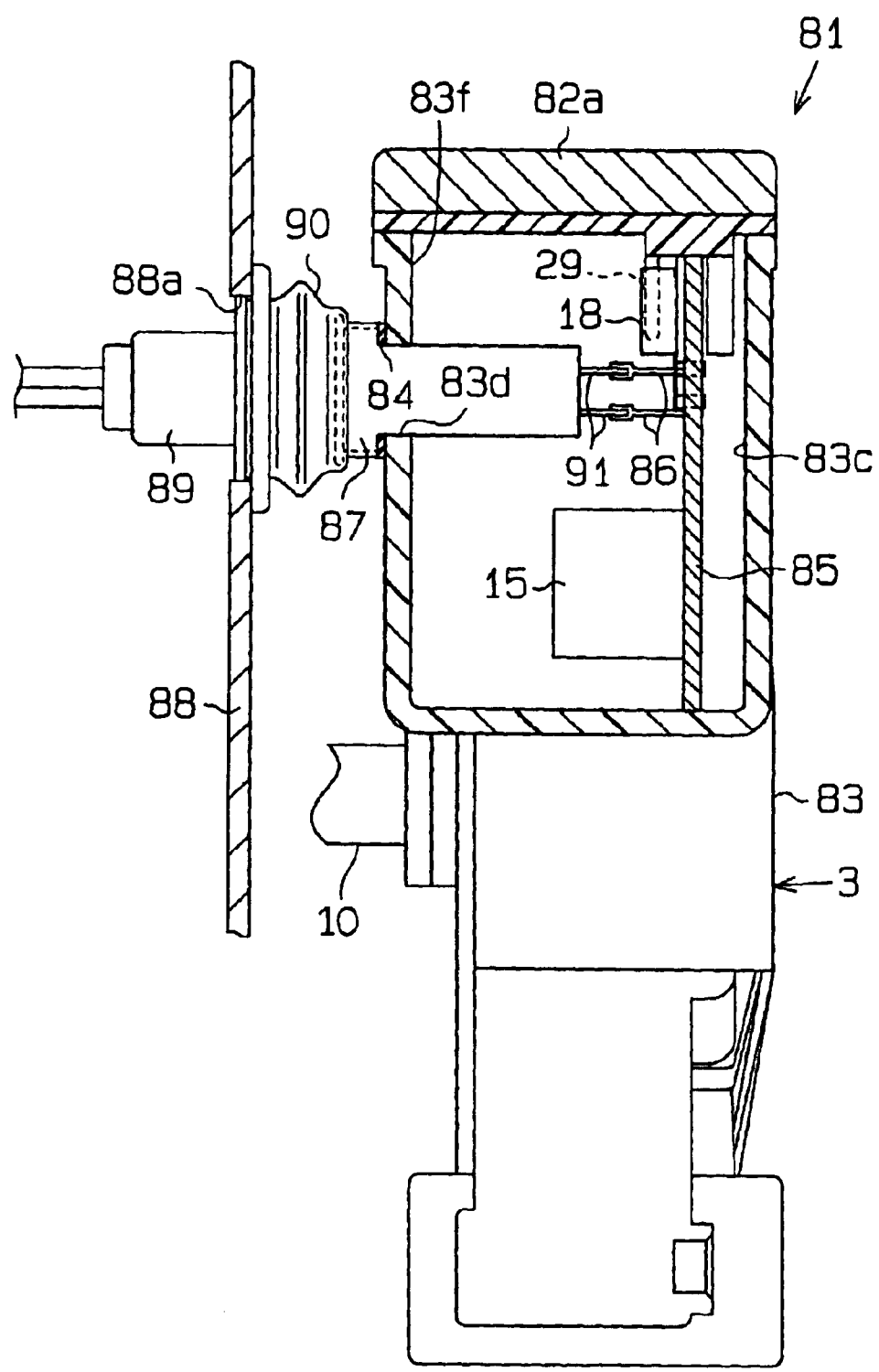
FIG. 11 is a partially fragmented side view of the motor of the sixth embodiment.

A motor (power window motor) 81 used in the vehicle power window system according to a sixth embodiment of the present invention will be described with reference to FIGS. 10 and 11. In the present embodiment, different components of the motor 81, which are different from those of the motor 71 of the fifth embodiment, will be described in detail, and similar components of the motor 81, which are similar to those of the motor 71 of the fifth embodiment, will be indicated by the same numerals and will not be described in detail.

In the motor main body 2, a brush holder member 82, which is secured to the opening of the yoke 4, includes an extension 82a, which projects radially outward from the opening of the yoke 4. Unlike the fifth embodiment, the brush holder member 82 of the present embodiment does not have the connector installation opening 72b and the engaging holes 72c of the fifth embodiment. Also, the connector sealing portion Sa is not formed in the resilient sealing member S.

A gear housing 83 includes a worm shaft receiving portion 83a, which receives and supports the worm shaft 75, and a wheel receiving portion 83b, which receives the worm wheel 12. The gear housing 83 further includes a circuit board receiving portion 83c on one side of the worm shaft 75, which is opposite from the wheel receiving portion 83b. The circuit board receiving portion 83c is formed into a generally rectangular tubular form and has an opening 83f at a side (the top side in FIG. 10 or 11), which corresponds to the extension 82a of the brush holder member 82. The opening 83f serves as a circuit board installation opening. Furthermore, at the circuit board receiving portion 83c of the present embodiment, a connector installation opening 83d is formed in the flat surface (i.e., the surface parallel to the plane of FIG. 10 or the surface perpendicular to the plane of FIG. 11) of the gear housing 83. The connector installation opening 83d is formed into a generally rectangular shape, and a sealing member 84 is bonded around the connector installation opening 83d.

A control circuit board 85 of the present embodiment includes the relay 15, the brush power supply terminals 18 and the connection terminals 86. At the time of assembling the yoke 4 (i.e., the motor main body 2) with the gear housing 83, the control circuit board 85 is received and is held in the circuit board receiving portion 83c. At this time, the brush power supply terminals 18 are connected to the corresponding brush side terminals 29, which protrude from the motor main body 2 (i.e., the yoke 4). Furthermore, at this time, the connection terminals 86 of the control circuit board 85 are positioned adjacent the connector installation opening 83d. More specifically, the connection terminals 86 are positioned rearward of the connector installation opening 83d when the connection terminals 86 are seen in a direction perpendicular to the flat direction of the gear housing 83, as shown in FIG. 10. Also, at this time, the driving-side rotator 74a of the rotatable shaft 73 is connected to the driven-side rotator 74b of the worm shaft 75. Furthermore, at this time, the circuit board receiving portion 83c is closed by, for example, the extension 82a of the brush holder member 82 except the connector installation opening 83d.

A connector housing 87 is secured to the connector installation opening 83d. As shown in FIG. 11, the connector housing 87 is formed to allow connection of an external connector 89 from the passenger room interior side (inner side) of an inner panel 88 of a vehicle door through a through hole 88a formed in the inner panel 88. The motor 81 of the present embodiment is arranged on the exterior side (outer side) of the inner panel 88 when securing portions 83e (FIG. 10) of the gear housing 83 are secured to the inner panel 88 by securing members (not shown). A panel sealing member 90, which seal the through hole 88a, is provided to the connector housing 87. The panel sealing member 90 is made of a resilient member (e.g., elastomer) in a form of bellows and extends from a distal end (the left end in FIG. 11) of the connector housing 87. A distal end of the panel sealing member 90 is engageable with the through hole 88a. The connector housing 87 includes connection terminals 91. The connection terminals 91 of the connector housing 87 are connected to the electric circuit components and more specifically to the connection terminals 86 of the control circuit board 85 when the connector housing 87 is installed to the gear housing 83 (more specifically, the connector installation opening 83d), in which the control circuit board 85 is provided. The connection terminals 91 of the connector housing 87 are connected to corresponding terminals of the external connector 89 when the external connector 89 is connected to the connector housing 87. When the connector housing 87 is installed to the gear housing 83 (more specifically, the connector installation opening 83d), a secured connection between the connector housing 87 and the gear housing 83 is sealed by the sealing member 84. Furthermore, at the time of installing the motor 81 to the inner panel 88, a distal end of the panel sealing member 90 is fitted into the through hole 88a of the inner panel 88, and the connector housing 87 is urged against and is connected with the inner panel 88 through the panel sealing member 90. That is, the connector housing 87 is clamped between the gear housing 83 and the inner panel 88.

The connector housing 87 is changed based on the design specification of the motor 81. As shown in FIG. 10, the connector housing 87 according to the design specification of the present embodiment includes eight connection terminals 91, which are arranged in two rows, each of which includes four of the connection terminals 91. For example, another connector housing according to another design specification can have a different number of the connection terminals. Furthermore, another connector housing according to another design specification can have connection terminals, which are positioned differently from the connection terminals 91 with respect to the securing portions 83e of the gear housing 83. That is, although not illustrated, the connector housing and the connection terminals can be bent in a crank like fashion based on the position of the through hole 88a of the inner panel 88.

In addition to advantages similar to the advantages of the first embodiment discussed in the sections (1) and (7) of the first embodiment, the motor 81 of the sixth embodiment can provide the following advantages.

(1) The connector housing 87 is installed in the direction perpendicular to the flat direction of the gear housing 83 and is clamped between the gear housing 83 and the inner panel 88. Thus, it is possible to prevent detachment of the connector housing 87 from the gear housing 83.

(2) The connector housing 87 is engaged with the inner panel 88 through the panel sealing member 90, which is resilient and seals the through hole 88a of the inner panel 88. Thus, for example, even when the positional accuracy of the motor 81 relative to the inner panel 88 at the time of assembly is relatively low, the connector housing 87 is effectively urged against the gear housing 83 by the resiliency of the panel sealing member 90 to prevent noisy jittering or rattling of the connector housing 87.

(Seventh Embodiment)

Figure 12:
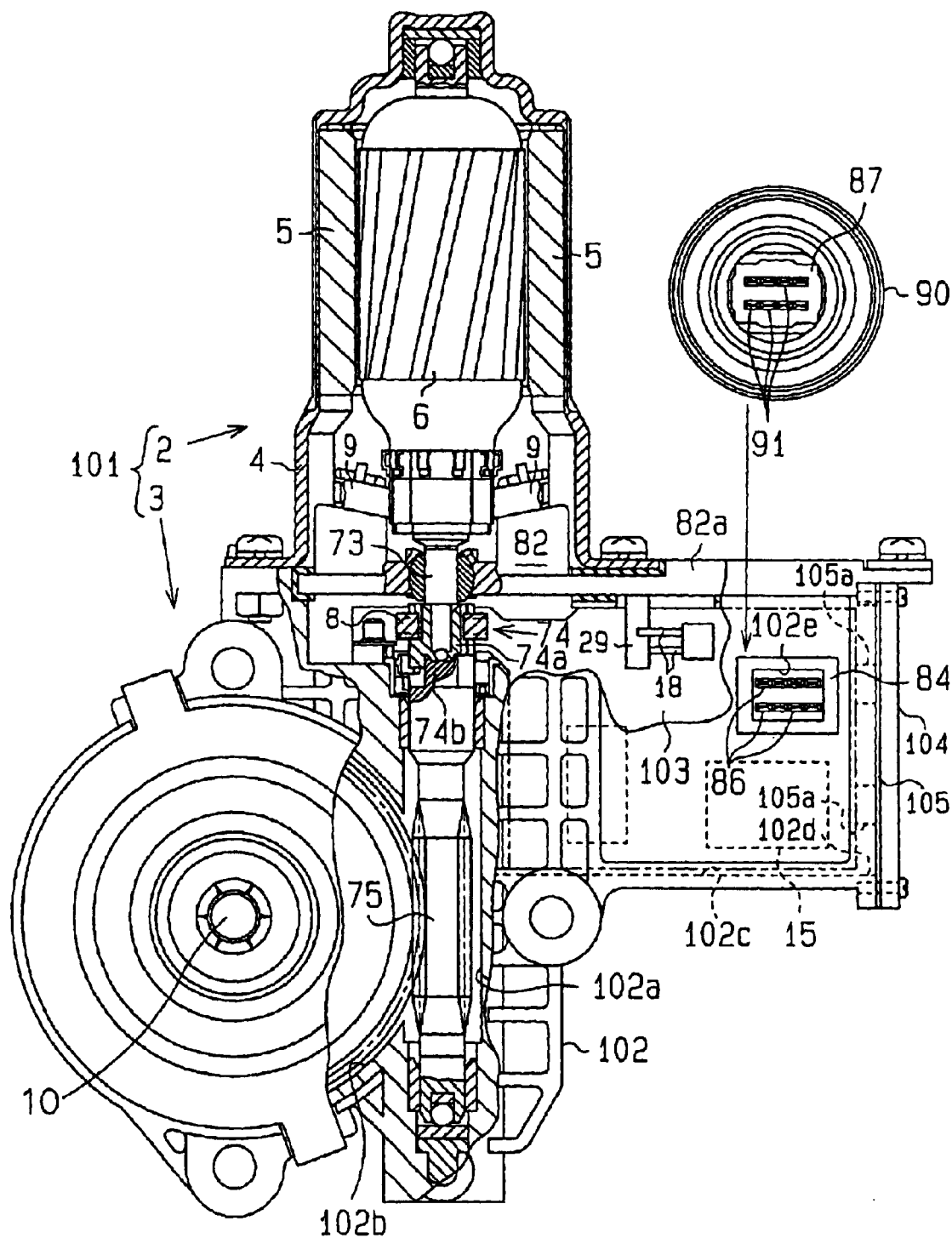
FIG. 12 is a partially fragmented frontal view of a motor according to a seventh embodiment of the present invention.
Figure 13:
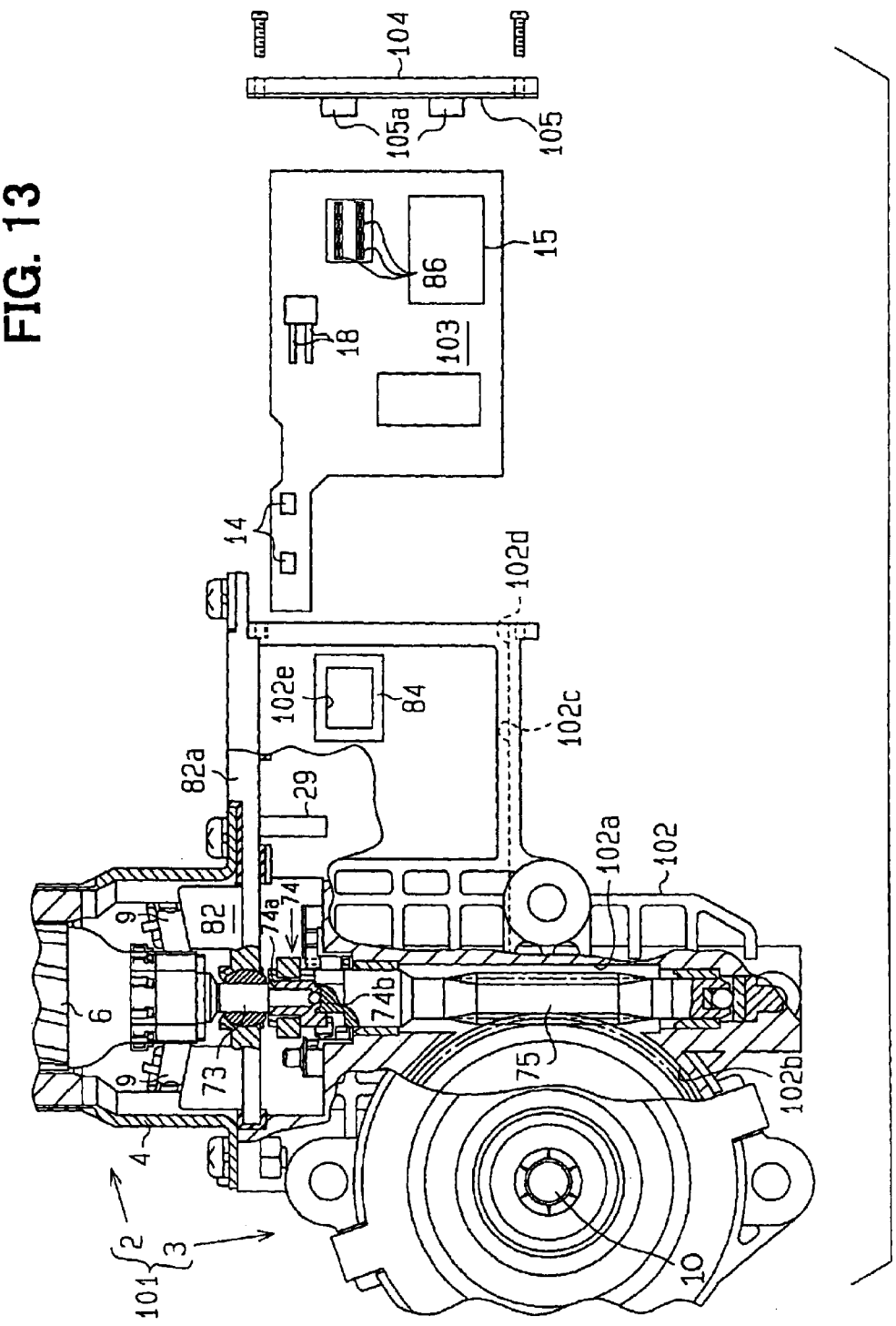
FIG. 13 is a partially fragmented and exploded frontal view of the motor of the seventh embodiment.

A motor (power window motor) 101 used in the vehicle power window system according to a seventh embodiment of the present invention will be described with reference to FIGS. 12 and 13. In the present embodiment, different components of the motor 101, which are different from those of the motor 81 of the sixth embodiment, will be described in detail, and similar components of the motor 101, which are similar to those of the motor 81 of the sixth embodiment, will be indicated by the same numerals and will not be described in detail.

A gear housing 102 includes a worm shaft receiving portion 102a, which receives and supports the worm shaft 75, and a wheel receiving portion 102b, which receives the worm wheel 12. The gear housing 102 further includes a circuit board receiving portion 102c on one side of the worm shaft 75, which is opposite from the wheel receiving portion 102b. The circuit board receiving portion 102c is formed into a generally rectangular tubular form and has an opening at one side (the top side in FIG. 12 or 13), which corresponds to the extension 82a of the brush holder member 82. An opening of the circuit board receiving portion 102c, which is located at another side (the right side in FIG. 12 or 13) where the wheel receiving portion 102b is not formed, is referred to as a circuit board installation opening 102d. Furthermore, at the circuit board receiving portion 102c, a connector installation opening 102e is formed in the flat surface (i.e., the surface parallel to the plane of FIG. 12 or 13) of the gear housing 102. The connector installation opening 102e is formed into a generally rectangular shape, and a sealing member 84 is bonded around the connector installation opening 102e.

The control circuit board 103 of the present embodiment includes the Hall elements 14 (FIG. 13), the relay 15, the brush power supply terminals 18 and the connection terminals 86 as the electric circuit components.

The control circuit board 103 is inserted into the circuit board receiving portion 102c through the circuit board installation opening 102d and is held in a predetermined position when a closing and securing member 104 is secured (screwed) in such a manner that the closing and securing member 104 closes the circuit board installation opening 102d. More specifically, the closing and securing member 104 of the present embodiment is provided separately from the control circuit board 103. At the time of securing the closing and securing member 104, the closing and securing member 104 is engaged with the control circuit board 103 in the inserting direction (the left-right direction in FIG. 12 or 13) of the control circuit board 103. The closing and securing member 104 of the present embodiment includes a closing and sealing resilient member 105. The closing and sealing resilient member 105 is made of a resilient material (e.g., elastomer) and seals a securing connecting between the closing and securing member 104 and the peripheral edge of the circuit board installation opening 102d of the gear housing 102. A circuit board engaging portion 105a, which is engaged with the control circuit board 103, is integrally molded with the closing and sealing resilient member 105.

The circuit board engaging portion 105a of the present embodiment includes two bulged projections. The shape of the circuit board engaging portion 105a can be changed in any appropriate manner. With the above arrangement, the circuit board engaging portion 105a is urged against and is engaged with the control circuit board 103. Before securing the closing and securing member 104, the control circuit board 103 can be inserted into a predetermined position and can be temporarily held there. Alternatively, the control circuit board 103 can be previously inserted partway and can be temporarily held there. Thereafter, the control circuit board 103 can be further inserted to the predetermined position by pushing the control circuit board 103 via the closing and securing member 104 (i.e., the circuit board engaging portion 105a). When the control circuit board 103 is arranged at the predetermined position, the brush power supply terminals 18 are connected to the brush side terminals 29, which protrude from the motor main body 2 (i.e., the yoke 4). Furthermore, at this time, the connection terminals 86 of the control circuit board 103 are positioned adjacent the connector installation opening 102e. More specifically, the connection terminals 86 are positioned rearward of the connector installation opening 102e when the connection terminals 86 are seen in a direction perpendicular to the flat direction of the gear housing 102, as shown in FIG. 12.

Then, similar to the sixth embodiment, the connector housing 87 is secured to the connector installation opening 102e.

In addition to advantages similar to the advantages of the first embodiment discussed in the sections (1), (2) and (7) of the first embodiment and the advantages of the sixth embodiment discussed in the sections (1) and (2) of the sixth embodiment, the motor 101 of the sixth embodiment can provide the following advantages.

(1) The control circuit board 103 is placed in the predetermined position by simply securing the closing and securing member 104 in such a manner that the closing and securing member 104 closes the circuit board installation opening 102d. Thus, it is not required to perform the separate positioning and securing process, such as placing of the control circuit board 103 in the predetermined position, separately from the securing process for securing the closing and securing member 104. This allows easy manufacturing and assembly.

(2) The circuit board engaging portion 105a, which is engaged with (urged against) the control circuit board 103 is integrally molded in the closing and sealing resilient member 105, which seals the secured connection between the closing and securing member 104 and the circuit board installation opening 102d side of the gear housing 102. Thus, the number of components can be reduced, and jittering of the control circuit board 103 arranged in the predetermined position can be restrained. Furthermore, the jittering of the control circuit board 103 could cause, for example, erroneous measurements of the rotational speed of the sensor magnet through the Hall elements 14. However, with the above arrangement, such an incident is prevented, and high reliability of the electric circuit components can be achieved.

(3) The connector installation opening 102e and the circuit board installation opening 102d are arranged to allow installation of the connector housing 87 and the control circuit board 103 to the gear housing 102 in two orthogonal directions (i.e., the directions that are angled 90 degrees with respect to one another), respectively. The connection terminals 91 of the connector housing 87 are connected to the connection terminals 86 of the previously inserted control circuit board 103. In this way, movement of the control circuit board 103 in the direction perpendicular to the installation direction of the connector housing 87 can be prevented, thereby preventing deviation of the control circuit board 103 from its predetermined position. That is, it is possible to prevent detachment of the connector terminals 91 of the connector housing 87 from the circuit board installation opening 102d of the control circuit board 103.

(4) The circuit board engaging portion 105a of the closing and sealing resilient member 105 consists of the bulged projections. Thus, jittering of the control circuit board 103 can be advantageously restrained without excessively increasing the thickness of the sealing portion of the closing and sealing resilient member 105.

(Eighth Embodiment)

Figure 14:
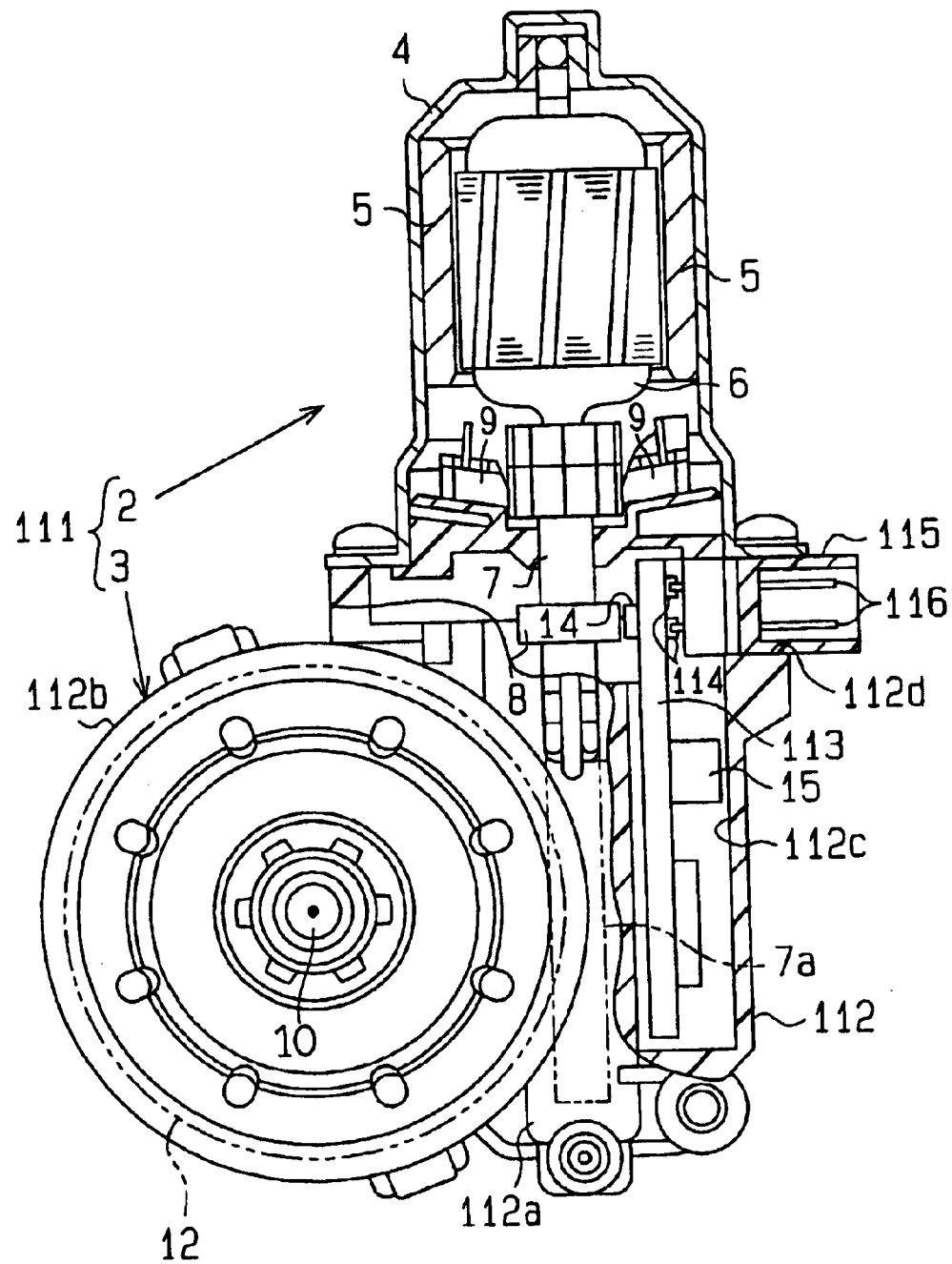
FIG. 14 is a partially fragmented frontal view of a motor according to an eighth embodiment of the present invention.
Figure 15:
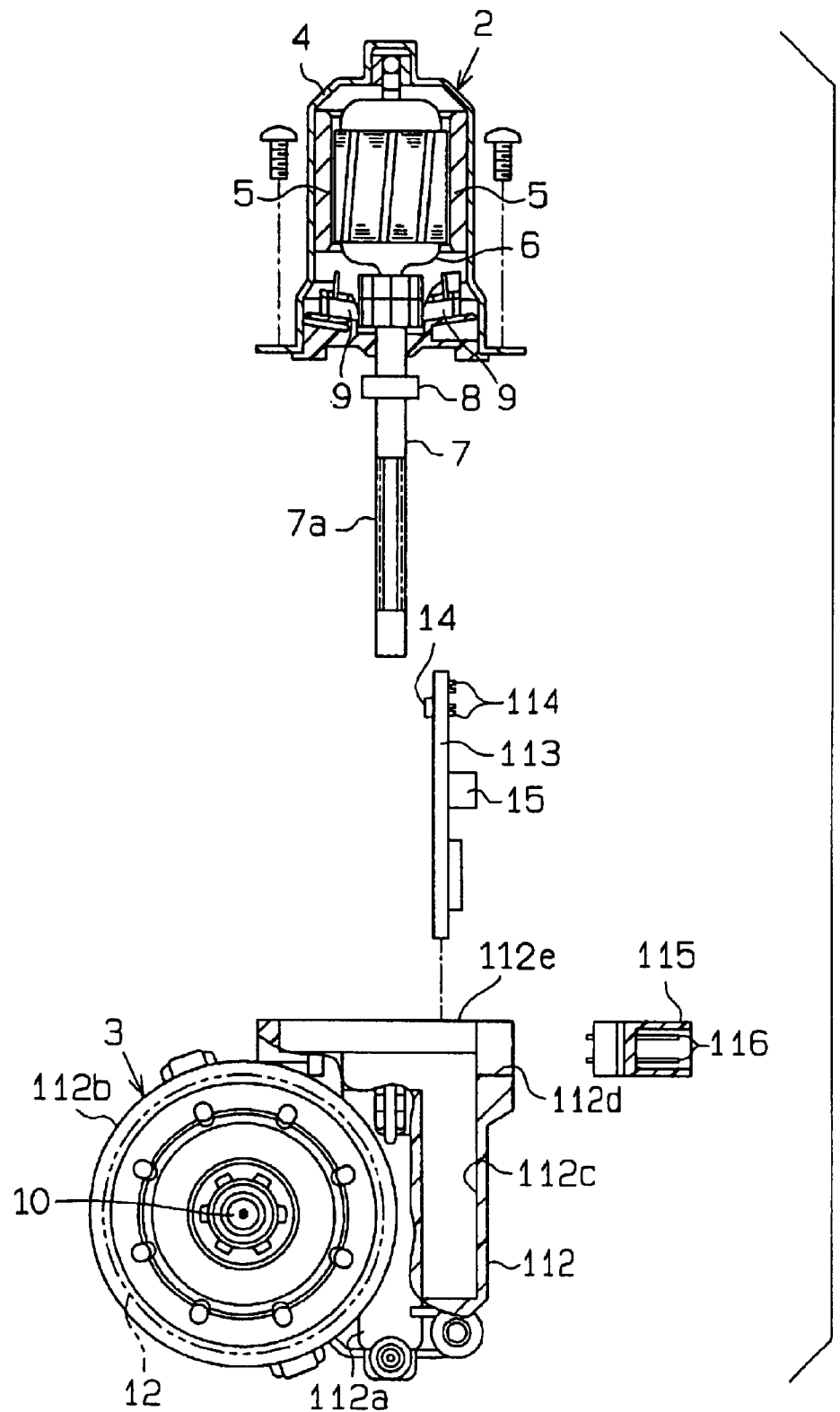
FIG. 15 is a partially fragmented and exploded frontal view of the motor of the eight embodiment.

A motor (power window motor) 111 used in the vehicle power window system according to an eighth embodiment of the present invention will be described with reference to FIGS. 14 and 15. In the present embodiment, different components of the motor 111, which are different from those of the motor 71 of the fifth embodiment, will be described in detail, and similar components of the motor 111, which are similar to those of the motor 71 of the fifth embodiment, will be indicated by the same numerals and will not be described in detail.

A gear housing 112 includes a worm shaft receiving portion 112a, which receives and supports the worm 7a, and a wheel receiving portion 112b, which receives the worm wheel 12. The gear housing 112 further includes a circuit board receiving portion 112c on one side of the worm 7a, which is opposite from the wheel receiving portion 112b. The circuit board receiving portion 112c is formed into a generally rectangular tubular form and has an opening 112e at one side (the top side in FIG. 14 or 15), which corresponds to a flange of the yoke 4. The opening 112e serves as a circuit board installation opening. The circuit board receiving portion 112c of the present embodiment includes a connector installation opening 112d. The connector installation opening 112d is opened in a direction (the right direction in FIG. 14 or 15) parallel to the flat surface (the surface parallel to the plane of FIG. 14 or 15) of the gear housing 112. The opening 112e of the circuit board receiving portion 112c, which is located at a side that corresponds to the flange of the yoke 4, is closed by the flange of the yoke 4 to form the connector installation opening 112d. Thus, the connector installation opening 112d has a rectangular opening when the connector installation opening 112d is seen in the direction parallel to the flat direction of the gear housing 112.

The control circuit board 113 of the present embodiment includes the Hall element 14, the relay 15 and connection terminals 114. At the time of assembling the yoke 4 (i.e., the motor main body 2) with the gear housing 112, the control circuit board 113 is received and is held in the circuit board receiving portion 112c. The control circuit board 113 of the present embodiment is arranged such that the planar direction (i.e., the direction perpendicular to the plane of FIG. 14 or 15) of the control circuit board 113 is perpendicular to the flat direction (i.e., the direction parallel to the plane of FIG. 14 or 15) of the gear housing 112. That is, a plane of the control circuit board 113 is perpendicular to an imaginary plane, which is perpendicular to the rotational axis of the output shaft 10. At this time, the connection terminals 114 of the control circuit board 113 are positioned adjacent the connector installation opening 112d. More specifically, the connection terminals 114 are positioned rearward of the connector installation opening 112d when the connection terminals 114 are seen in a direction perpendicular to the flat direction of the gear housing 112. Furthermore, at this time, the circuit board receiving portion 112c is closed by the flange of the yoke 4 except the connector installation opening 112d.

A connector housing 115 is secured (fitted) to the connector installation opening 112d. The connector housing 115 according to the design specification of the present embodiment includes a plurality of connection terminals 116, which are parallel to one another. An external connector is connected to the connector housing 115 from the side (the right side in FIG. 14 or 15), at which the wheel receiving portion 112b is not formed, in a direction that is parallel to the flat direction of the gear housing 112 and is perpendicular to the rotatable shaft 7.

In addition to advantages similar to the advantages of the first embodiment discussed in the section (1) of the first embodiment, the motor 111 of the eighth embodiment can provide the following advantages.

(1) The control circuit board 113 of the present embodiment is arranged such that the planar direction (i.e., the direction perpendicular to the plane of FIG. 14 or 15) of the control circuit board 113 is perpendicular to the flat direction (i.e., the direction parallel to the plane of FIG. 14 or 15) of the gear housing 112. Thus, when the gear housing 112 is seen in the direction perpendicular to the flat direction of the gear housing 112 (FIGS. 14 and 15), the profile (i.e., the size in the left-right direction in FIG. 14 or 15) of the gear housing 112 can be minimized.

The above embodiments can be modified as follows.

In the first to fourth embodiments, the closing and securing member 28, 44, 54, 64 is previously secured to the control circuit board 13, 43, 53, 63, and the control circuit board 13, 43, 53, 63 is placed in the predetermined position by securing the closing and securing member 28, 44, 54, 64. However, this can be modified to any other suitable arrangement. For example, the control circuit board can be secured in the circuit board receiving portion using any other arrangement, and thereafter, the circuit board installation opening can be closed.

The circuit board receiving portion 11b, 42b, 52b, 62b, 76c, 83c, 102c, 112c of the gear housing 11, 42, 52, 62, 76, 83, 102, 112 can have slits or guide grooves, along which the control circuit board 13, 43, 53, 63, 77, 85, 103, 113 can be guided and inserted into the circuit board receiving portion 11b, 42b, 52b, 62b, 76c, 83c, 102c, 112c. In this way, the control circuit board 13, 43, 53, 63, 77, 85, 103, 113 can be smoothly inserted into the circuit board receiving portion 11b, 42b, 52b, 62b, 76c, 83c, 102c, 112c.

In the first to fifth and eighth embodiments, the connector housing 31, 78, 115 is installed in the direction parallel to the flat direction of the gear housing 11, 42, 52, 62, 76, 112. However, it is possible to modify the above arrangement to allow installation of the connector housing 31, 78, 115 in the direction perpendicular to the flat direction. In such a case, it is not necessary to engage the connector housing 31, 78, 115 with the inner panel 88 as in the case of the sixth and seventh embodiments.

In each of the above embodiments, the present invention is embodied in the motor (power window motor) 1, 41, 51, 61, 71, 81, 101, 111 used in the vehicle power window system. However, the present invention can be embodied in motors used in any other appropriate apparatuses.

Additional advantages and modifications will readily occur to those skilled in the art. The invention in its broader terms is therefore not limited to the specific details, representative apparatus, and illustrative examples shown and described.

What is claimed is:

1. An electric motor comprising:
   a motor main body that is rotated upon energization of the motor main body;
   a speed reducing unit that includes:
      a speed reducing mechanism that reduces rotational speed of the motor main body; and
      a gear housing that receives the speed reducing mechanism;
   a control circuit board that is held in the gear housing and has at least one electric circuit component;
   a connector housing that is detachably connected to the gear housing and is connectable with an external connector, wherein:
   the connector housing is formed separately from the gear housing;
   the connector housing includes a plurality of connection terminals that are secured to the connector housing; and
   the connection terminals of the connector housing are detachably connected with the at least one electric circuit component of the control circuit board and are connectable with corresponding terminals of the external connector; and
   an output shaft, which is connected to the speed reducing mechanism to output rotational force from the motor, wherein a plane of the control circuit board is parallel to an imaginary plane, which is perpendicular to a rotational axis of the output shaft.

2. The motor according to claim 1, wherein the motor is constructed such that the control circuit board is installable in the gear housing after assembly of the motor main body to the gear housing.

3. An electric motor comprising:
   a motor main body that is rotated upon energization of the motor main body;
   a speed reducing unit that includes:
      a speed reducing mechanism that reduces rotational speed of the motor main body; and
      a gear housing that receives the speed reducing mechanism;
   a control circuit board that is held in the gear housing and has at least one electric circuit component; and
   a connector housing that is provided to the gear housing and is connectable with an external connector, wherein:
   the connector housing is formed separately from the gear housing;
   the connector housing includes a plurality of connection terminals that are secured to the connector housing; and
   the connection terminals of the connector housing are connected with the at least one electric circuit component of the control circuit board and are connectable with corresponding terminals of the external connector;
   the gear housing includes a circuit board installation opening, through which the control circuit board is installed in the gear housing; and
   the circuit board installation opening is provided with a closing and securing member, wherein the closing and securing member closes the circuit board installation opening such that the closing and securing member holds the control circuit board in a predetermined position in the gear housing.

4. The motor according to claim 3, wherein:
   the closing and securing member is formed separately from the control circuit board and is engaged with the control circuit board in an inserting direction that the control circuit board is inserted into the gear housing;
   the closing and securing member includes a closing and sealing resilient member, which seals a connection between the closing and securing member and a portion of the gear housing located around the circuit board installation opening; and
   the closing and sealing resilient member includes a circuit board engaging portion, which is integrally molded with the closing and sealing resilient member and is engaged with the control circuit board.

5. An electric motor comprising:
   a motor main body that is rotated upon energization of the motor main body;
   a speed reducing unit that includes:
      a speed reducing mechanism that reduces rotational speed of the motor main body; and
      a gear housing that receives the speed reducing mechanism;
   a control circuit board that is held in the gear housing and has at least one electric circuit component; and
   a connector housing that is provided to the gear housing and is connectable with an external connector, wherein:
   the connector housing is formed separately from the gear housing;
   the connector housing includes a plurality of connection terminals that are secured to the connector housing;
   the connection terminals of the connector housing are connected with the at least one electric circuit component of the control circuit board and are connectable with corresponding terminals of the external connector;
   the motor is constructed such that the control circuit board is installable in the gear housing after assembly of the motor main body to the gear housing;
   the gear housing includes a circuit board installation opening, through which the control circuit board is installed in the gear housing;
   the circuit board installation opening is provided with a closing and securing member, which closes the circuit board installation opening; and
   the control circuit board is held in a predetermined position in the gear housing by the closing and securing member, wherein the closing and securing member is secured to the control circuit board before installation of the control circuit board in the gear housing and is then secured to the gear housing around the circuit board installation opening to close the circuit board installation opening.

6. An electric motor comprising:
   a motor main body that is rotated upon energization of the motor main body;
   a speed reducing unit that includes:
      a speed reducing mechanism that reduces rotational speed of the motor main body; and
      a gear housing that receives the speed reducing mechanism;
   a control circuit board that is held in the gear housing and has at least one electric circuit component; and
   a connector housing that is provided to the gear housing and is connectable with an external connector, wherein:
   the connector housing is formed separately from the gear housing;
   the connector housing includes a plurality of connection terminals that are secured to the connector housing;

the connection terminals of the connector housing are connected with the at least one electric circuit component of the control circuit board and are connectable with corresponding terminals of the external connector; and the gear housing includes a plurality of connector installation openings, and the connector housing is secured to one of the plurality of connector installation openings.

7. An electric motor comprising:

a motor main body that is rotated upon energization of the motor main body;

a speed reducing unit that includes:
    a speed reducing mechanism that reduces rotational speed of the motor main body; and
    a gear housing that receives the speed reducing mechanism;

a control circuit board that is held in the gear housing and has at least one electric circuit component; and a connector housing that is provided to the gear housing and is connectable with an external connector, wherein:

the connector housing is formed separately from the gear housing;

the connector housing includes a plurality of connection terminals that are secured to the connector housing; and the connection terminals of the connector housing are connected with the at least one electric circuit component of the control circuit board and are connectable with corresponding terminals of the external connector;

the gear housing includes:
    a circuit board installation opening, through which the control circuit board is installed in the gear housing; and
    a connector installation opening, to which the connector housing is secured; and the circuit board installation opening and the connector installation opening have a generally identical shape and size, so that the control circuit board is installable in the gear housing through any one of the circuit board installation opening and the connector installation opening, and the connector housing is securable to any one of the circuit board installation opening and the connector installation opening.

8. An electric motor comprising:

a motor main body that is rotated upon energization of the motor main body;

a speed reducing unit that includes:
    a speed reducing mechanism that reduces rotational speed of the motor main body; and
    a gear housing that receives the speed reducing mechanism;

a control circuit board that is held in the gear housing and has at least one electric circuit component; and a connector housing that is provided to the gear housing and is connectable with an external connector, wherein:

the connector housing is formed separately from the gear housing;

the connector housing includes a plurality of connection terminals that are secured to the connector housing; and the connection terminals of the connector housing are connected with the at least one electric circuit component of the control circuit board and are connectable with corresponding terminals of the external connector;

the motor main body includes a brush holder member, wherein the brush holder member holds a plurality of power supply brushes and includes a resilient sealing member; and the resilient sealing member seals a connection between the motor main body and the gear housing and includes a connector sealing portion, which seals a connection between the gear housing and the connector housing.

9. An electric motor comprising:

a motor main body that is rotated upon energization of the motor main body;

a speed reducing unit that includes:
    a speed reducing mechanism that reduces rotational speed of the motor main body; and
    a gear housing that receives the speed reducing mechanism;

a control circuit board that is held in the gear housing and has at least one electric circuit component; and a connector housing that is provided to the gear housing and is connectable with an external connector, wherein:

the connector housing is formed separately from the gear housing;

the connector housing includes a plurality of connection terminals that are secured to the connector housing; and the connection terminals of the connector housing are connected with the at least one electric circuit component of the control circuit board and are connectable with corresponding terminals of the external connector;

the gear housing includes:
    a circuit board installation opening, through which the control circuit board is installed in the gear housing; and
    a connector installation opening, to which the connector housing is secured; and the circuit board installation opening is oriented in a direction, which is different from that of the connector installation opening.

10. The motor according to claim 9, wherein the circuit board installation opening is oriented in a direction, which is angled generally 180 degrees from the direction of orientation of the connector installation opening.

11. The motor according to claim 9, wherein the circuit board installation opening is oriented in a direction, which is angled generally 90 degrees from the direction of orientation of the connector installation opening.

12. An electric motor comprising:

a motor main body that is rotated upon energization of the motor main body;

a speed reducing unit that includes:
    a speed reducing mechanism that reduces rotational speed of the motor main body; and
    a gear housing that receives the speed reducing mechanism;

a control circuit board that is held in the gear housing and has at least one electric circuit component; and a connector housing that is provided to the gear housing and is connectable with an external connector, wherein:

the connector housing is formed separately from the gear housing;

the connector housing includes a plurality of connection terminals that are secured to the connector housing; and the connection terminals of the connector housing are connected with the at least one electric circuit component of the control circuit board and are connectable with corresponding terminals of the external connector;

the gear housing includes:
    a circuit board installation opening, through which the control circuit board is installed in the gear housing; and a connector installation opening, to which the connector housing is secured; and the circuit board installation opening is oriented in the same direction as that of the connector installation opening.

13. An electric motor comprising:

a motor main body that is rotated upon energization of the motor main body;

a speed reducing unit that includes:
- a speed reducing mechanism that reduces rotational speed of the motor main body; and
- a gear housing that receives the speed reducing mechanism;

a control circuit board that is held in the gear housing and has at least one electric circuit component;

a connector housing that is provided to the gear housing and is connectable with an external connector; and an output shaft, which is connected to the speed reducing mechanism to output rotational force from the motor, wherein:

a plane of the control circuit board is perpendicular to an imaginary plane, which is perpendicular to the rotational axis of the output shaft;

the connector housing is formed separately from the gear housing;

the connector housing includes a plurality of connection terminals that are secured to the connector housing; and the connection terminals of the connector housing are connected with the at least one electric circuit component of the control circuit board and are connectable with corresponding terminals of the external connector.

14. An electric motor comprising:

a motor main body that is rotated upon energization of the motor main body;

a speed reducing unit that includes:
- a speed reducing mechanism that reduces rotational speed of the motor main body; and
- a gear housing that receives the speed reducing mechanism;

a control circuit board that is held in the gear housing and has at least one electric circuit component;

a connector housing that is provided to the gear housing and is connectable with an external connector; and an output shaft, which is connected to the speed reducing mechanism to output rotational force from the motor, wherein:

the connector housing is formed separately from the gear housing;

the connector housing includes a plurality of connection terminals that are secured to the connector housing;

the connection terminals of the connector housing are connected with the at least one electric circuit component of the control circuit board and are connectable with corresponding. terminals of the external connector;

the motor is a power window motor arranged on an exterior side of an inner panel of a vehicle door, which has a through hole that penetrates through the inner panel;

the connector housing is placed adjacent the through hole of the inner panel on the exterior side of the inner panel and is connected with the external connector, which is installed from an interior side of the inner panel; and the connector housing is installed to the gear housing in a direction parallel to a rotational axis of the output shaft and is clamped between the gear housing and the inner panel.

15. The motor according to claim 14, wherein:

the connector housing is provided with a panel sealing member, which is resilient and seals the through hole of the inner panel; and the connector housing is connected to the inner panel through the panel sealing member.

* * * * *